United States Patent [19]
Robins

[11] Patent Number: 5,590,124
[45] Date of Patent: Dec. 31, 1996

[54] LINK AND DISCOVERY PROTOCOL FOR A RING INTERCONNECT ARCHITECTURE

[75] Inventor: Nicholas Robins, San Francisco, Calif.

[73] Assignee: Apple Computer, Inc., Cupertino, Calif.

[21] Appl. No.: 479,531

[22] Filed: Jun. 7, 1995

Related U.S. Application Data

[62] Division of Ser. No. 57,913, May 7, 1993, Pat. No. 5,457,683.

[51] Int. Cl.⁶ .................................................. H04L 12/56
[52] U.S. Cl. .......................................... 370/258; 370/403
[58] Field of Search ........................... 370/85.13, 85.14, 370/85.12, 94.1, 94.3, 94.2, 60, 60.1

[56] References Cited

U.S. PATENT DOCUMENTS

| | | |
|---|---|---|
| 5,119,481 | 6/1992 | Frank et al. . |
| 5,165,019 | 11/1992 | Sweazey . |
| 5,165,024 | 11/1992 | Sweazey . |
| 5,237,567 | 8/1993 | Nay et al. . |
| 5,241,682 | 8/1993 | Bryant et al. ................ 370/85.14 |
| 5,307,346 | 4/1994 | Fieldhouse . |
| 5,315,582 | 5/1994 | Morizono et al. ............ 370/85.14 |
| 5,400,333 | 3/1995 | Perlman ....................... 370/85.14 |

OTHER PUBLICATIONS

*Designing Cards and Drivers for the MacIntosh Family,* Third Edition, pp. 141–183 (Addison–Wesley Publishing Company 1992).

National Semiconductor, *QR0001 Quickring™ Data Stream Controller Interface,* pp. 1–28, Rev. 13, May 1993.

*Primary Examiner*—Wellington Chin
*Attorney, Agent, or Firm*—Burns, Doane, Swecker & Mathis, L.L.P.

[57] ABSTRACT

A protocol for use in a system including a first node, a second node and, in some instances, a third node, each of the first, second and third nodes coupled to each other of the first, second and third nodes by a point to point packet-based communication system defines transactions for transferring variable amounts of data from one node to another. A GET transaction allows an instigator node to send a packet to a partner node. The packet specifies data length, and an address in the partner node's resource. A PUT transaction similarly allows an instigator node to send a packet specifying a response port identifier, a data length and an address in a partner node's resource to which data is to be written. A PROXY transaction is disclosed which allows an instigator node to cause a source partner node to send data to a target (destination) partner node. Other transactions are also disclosed. In each instance, port identifiers accompany packets in order to associate received data with a particular transaction. A discovery protocol allows an instigator node to use the data transfer protocol to determine the topology of the ring architecture to which it is coupled.

2 Claims, 25 Drawing Sheets

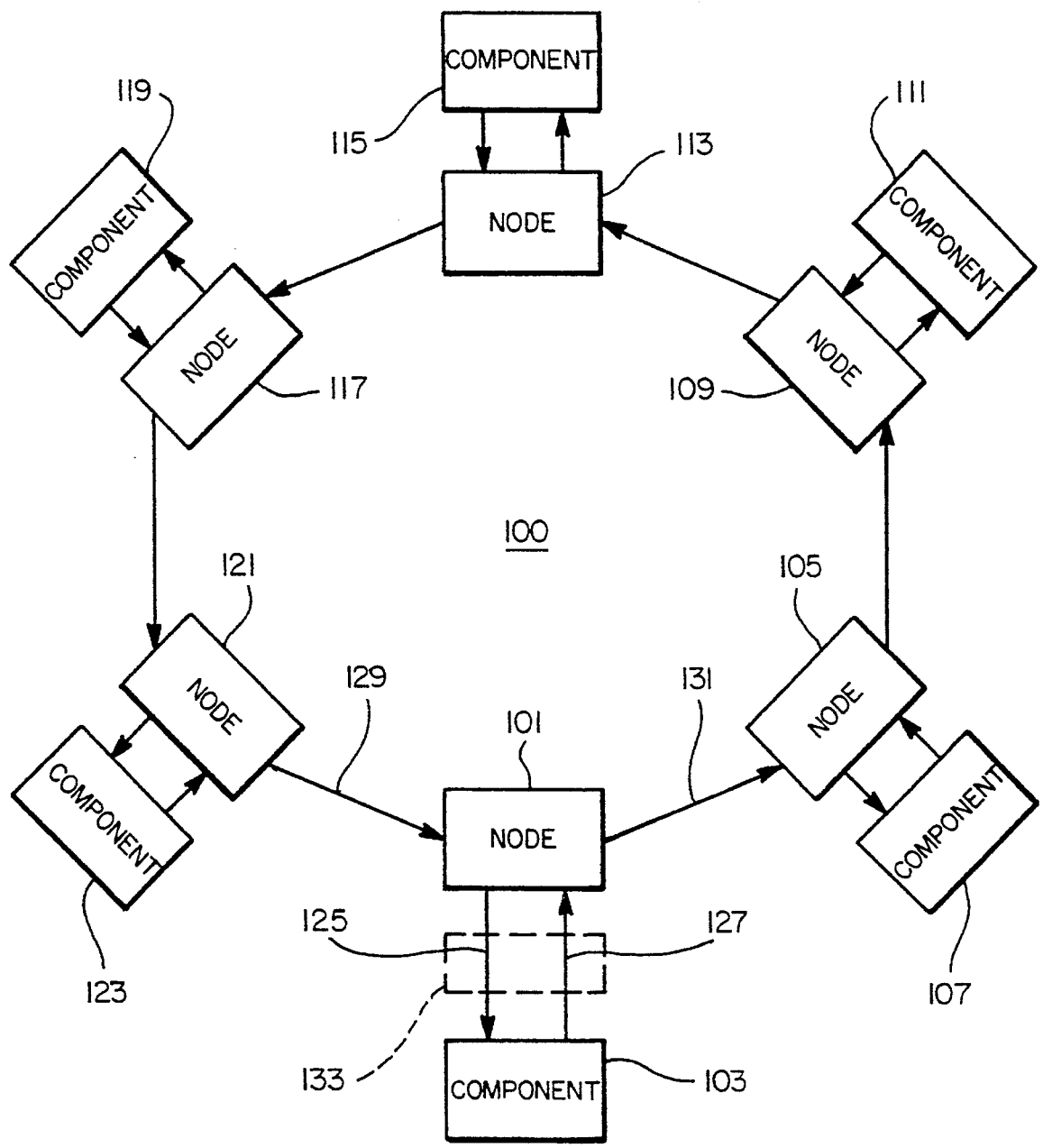
FIG_1

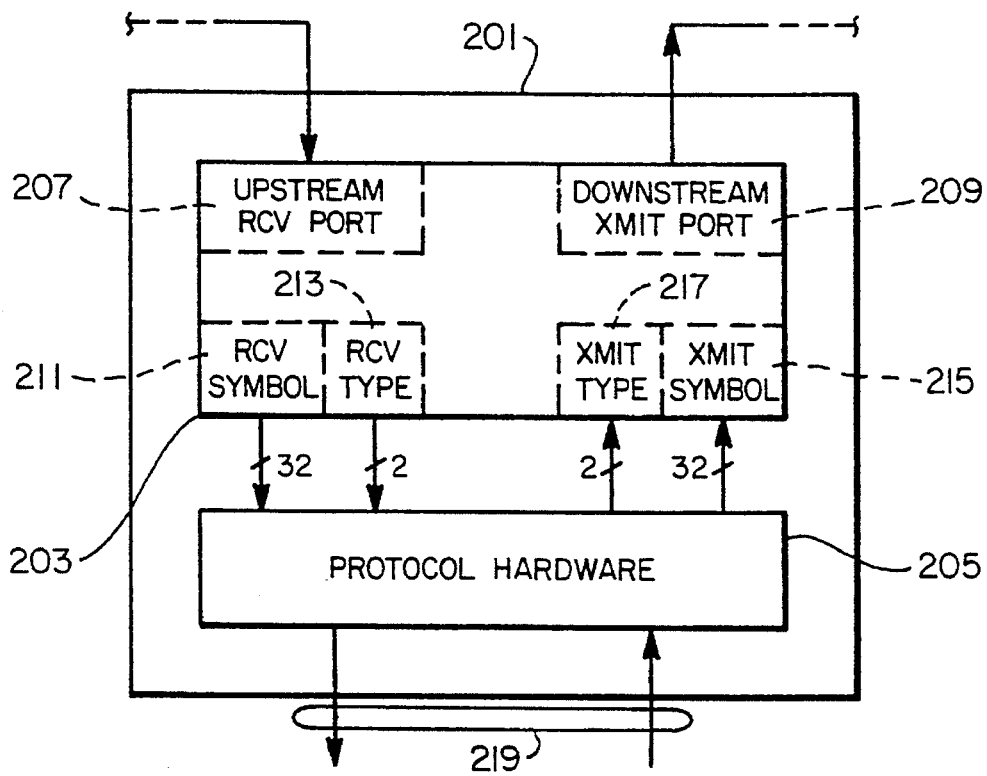
FIG_2
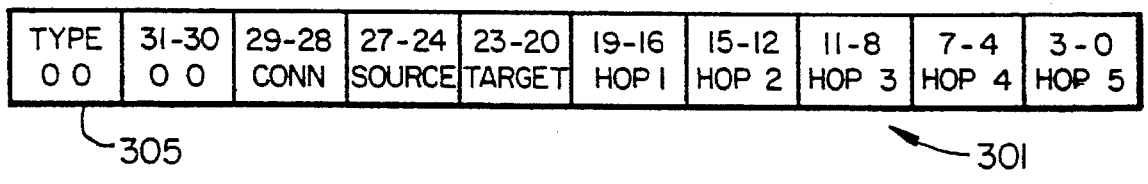
FIG_3a
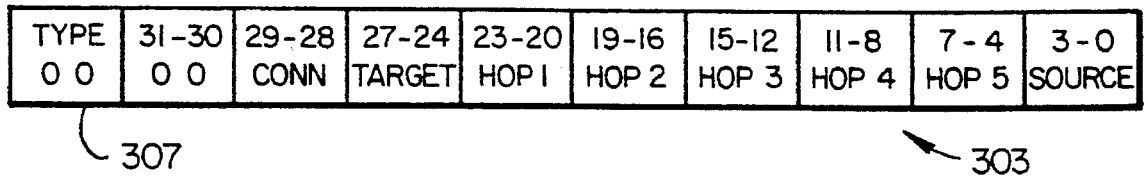
FIG_3b

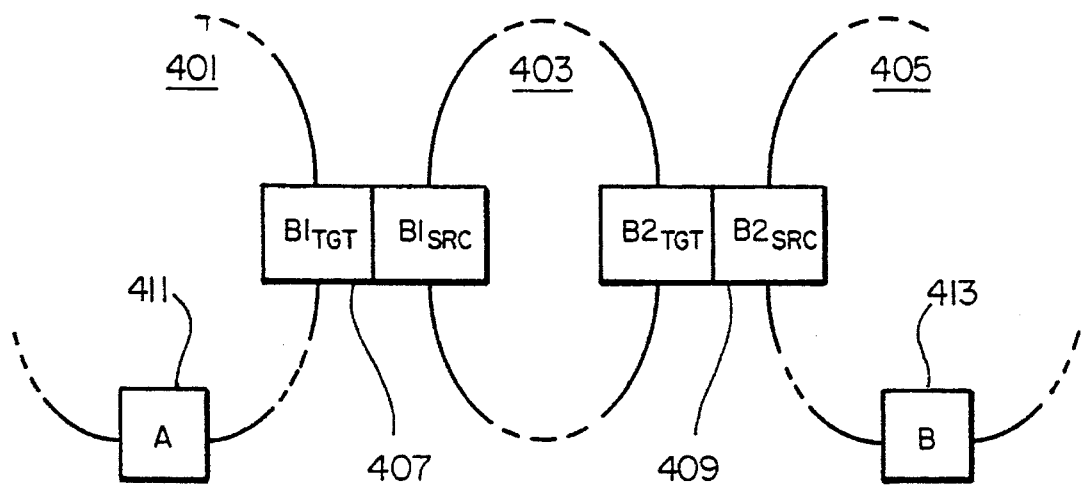
FIG_4
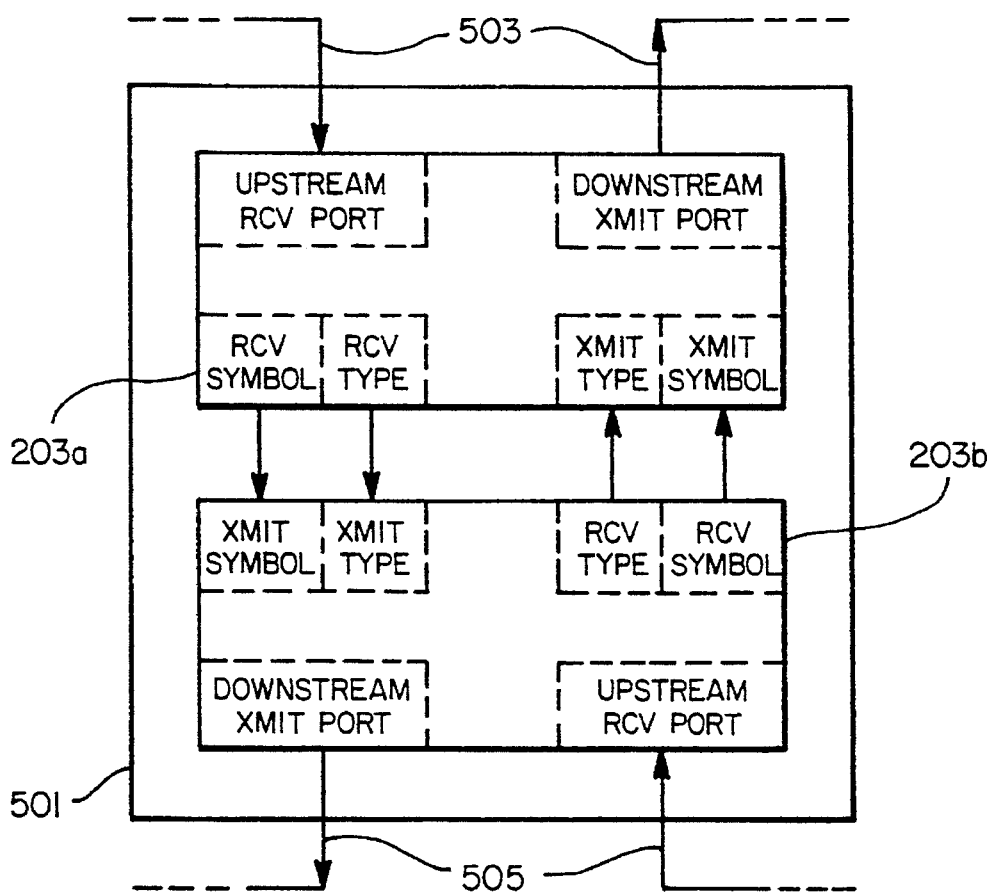
FIG_5

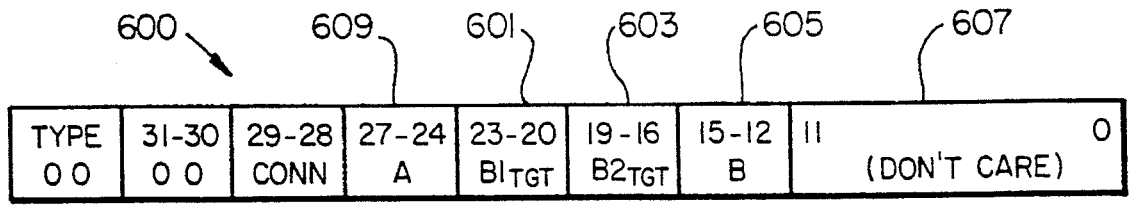
FIG_6a
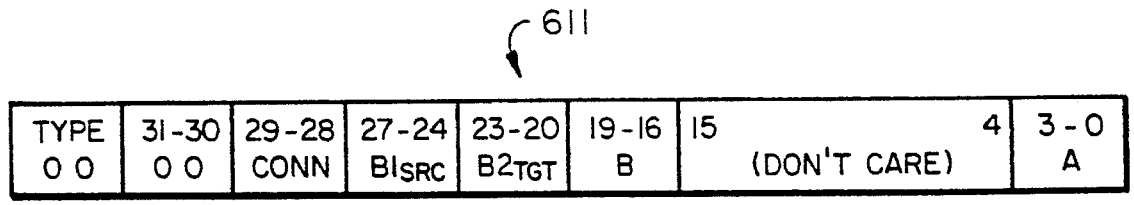
FIG_6b
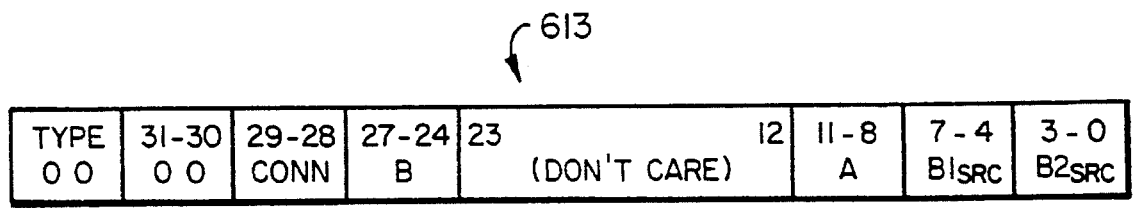
FIG_6c

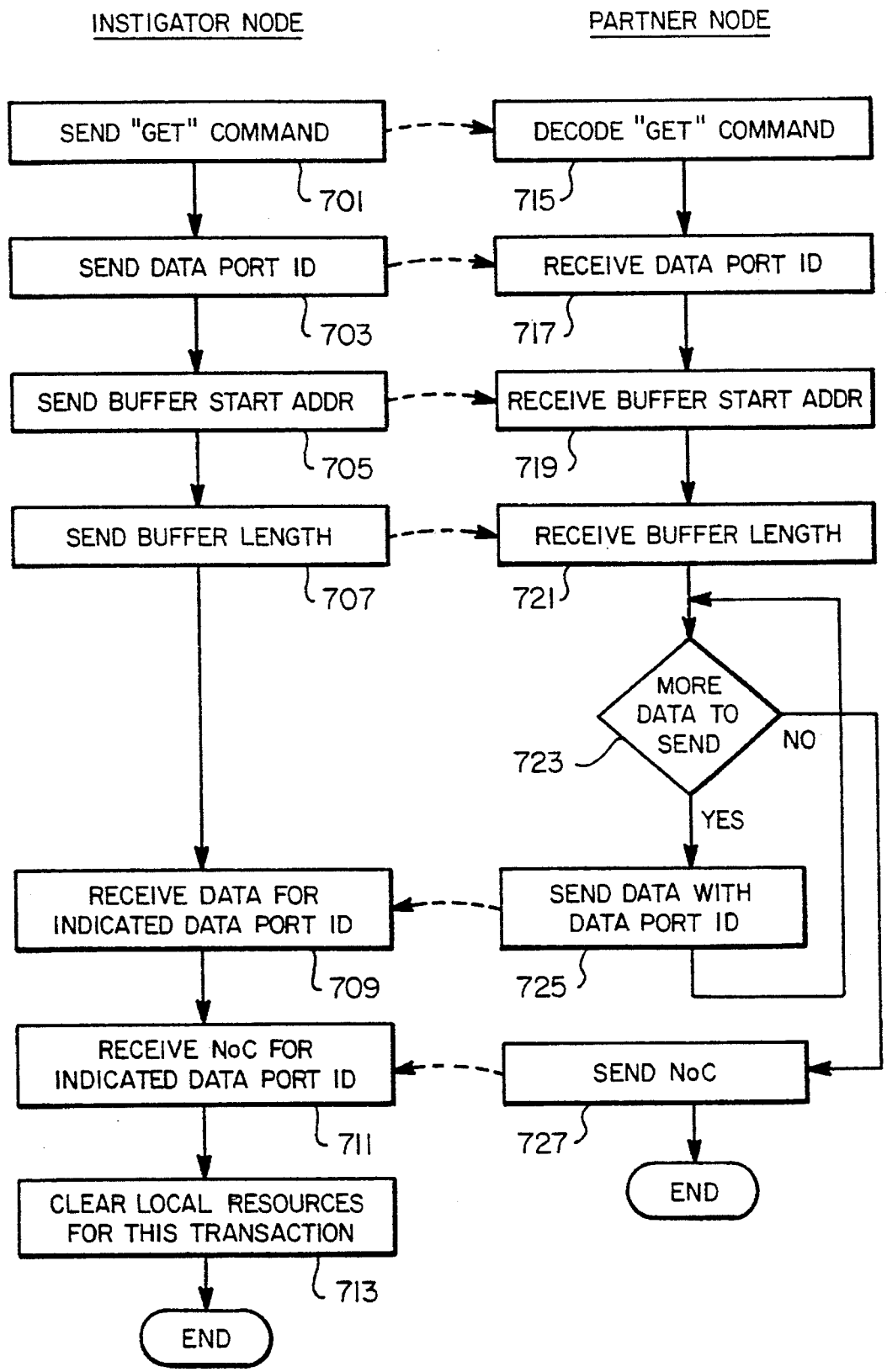
FIG_7

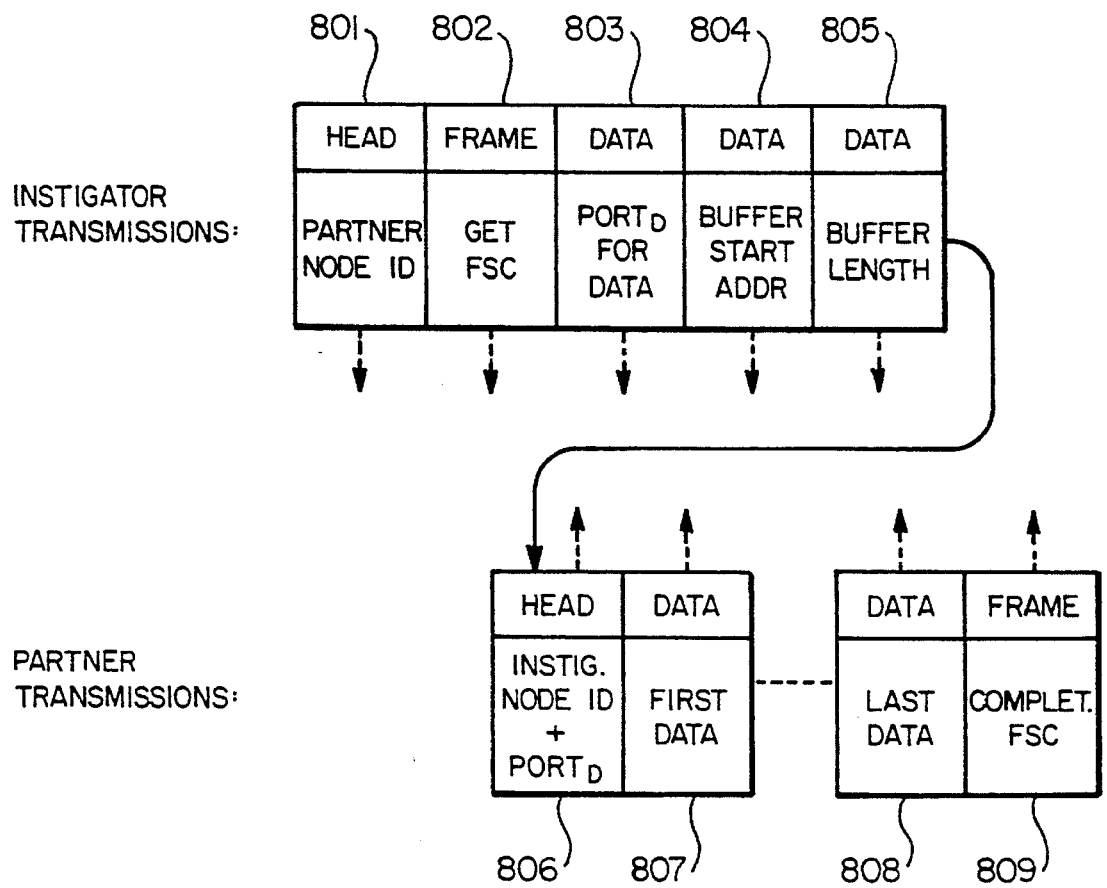
FIG_8
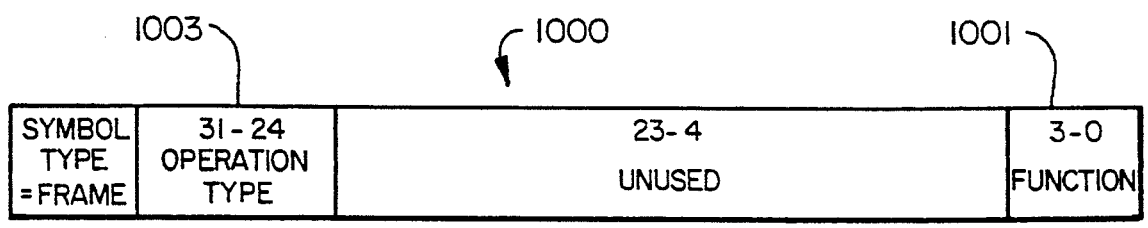
FIG_10

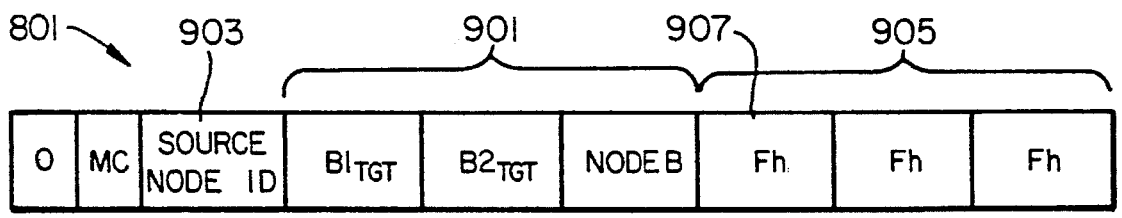
FIG_9a
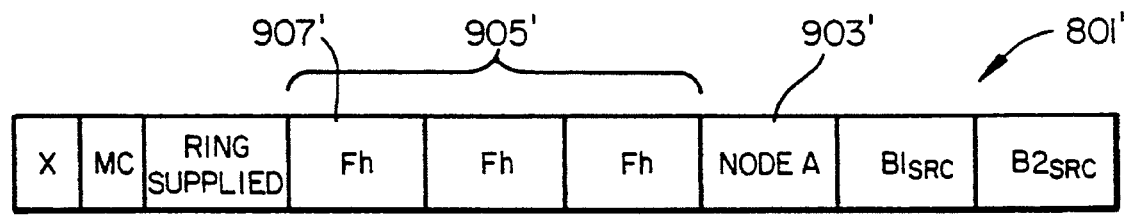
FIG_9b
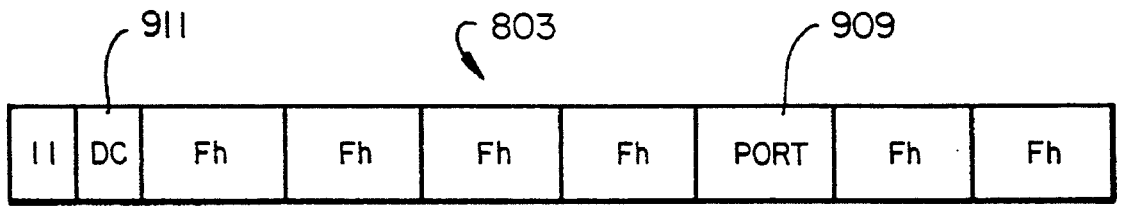
FIG_9c
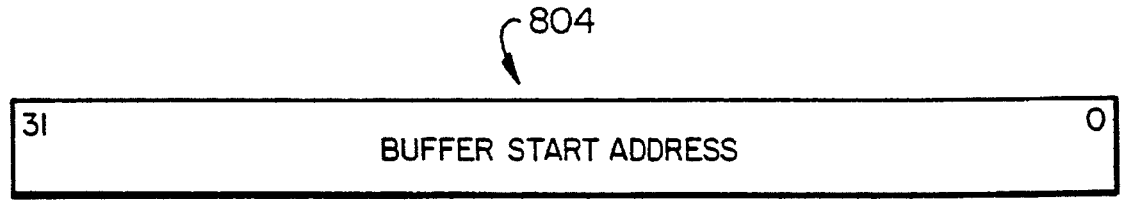
FIG_9d

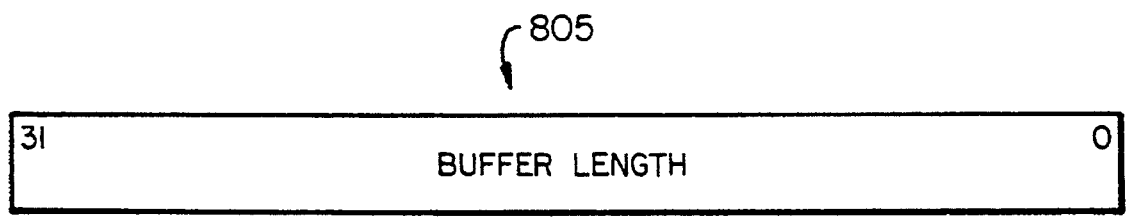
FIG_9e
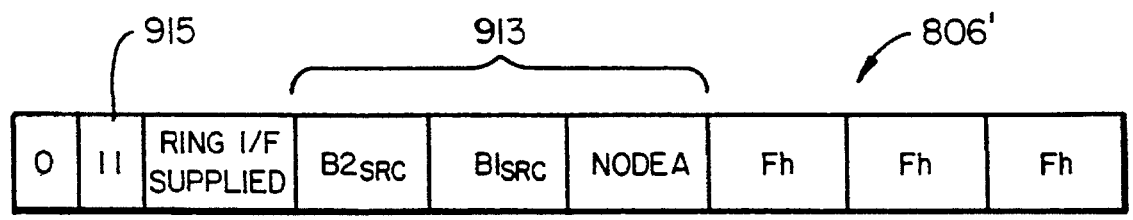
FIG_9f
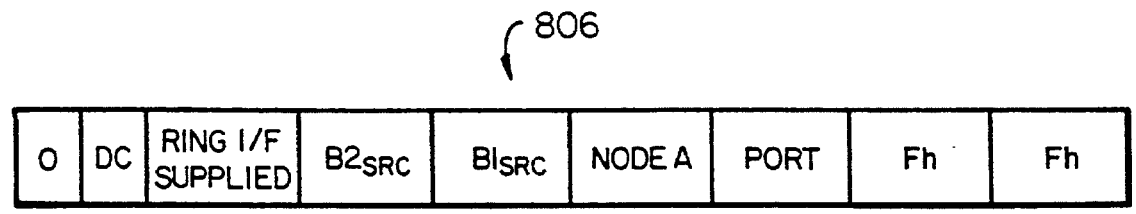
FIG_9g
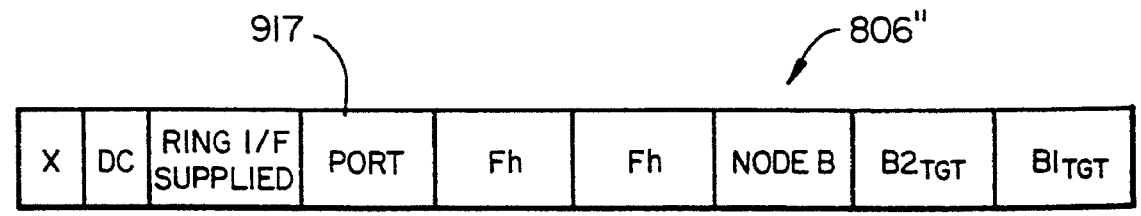
FIG_9h

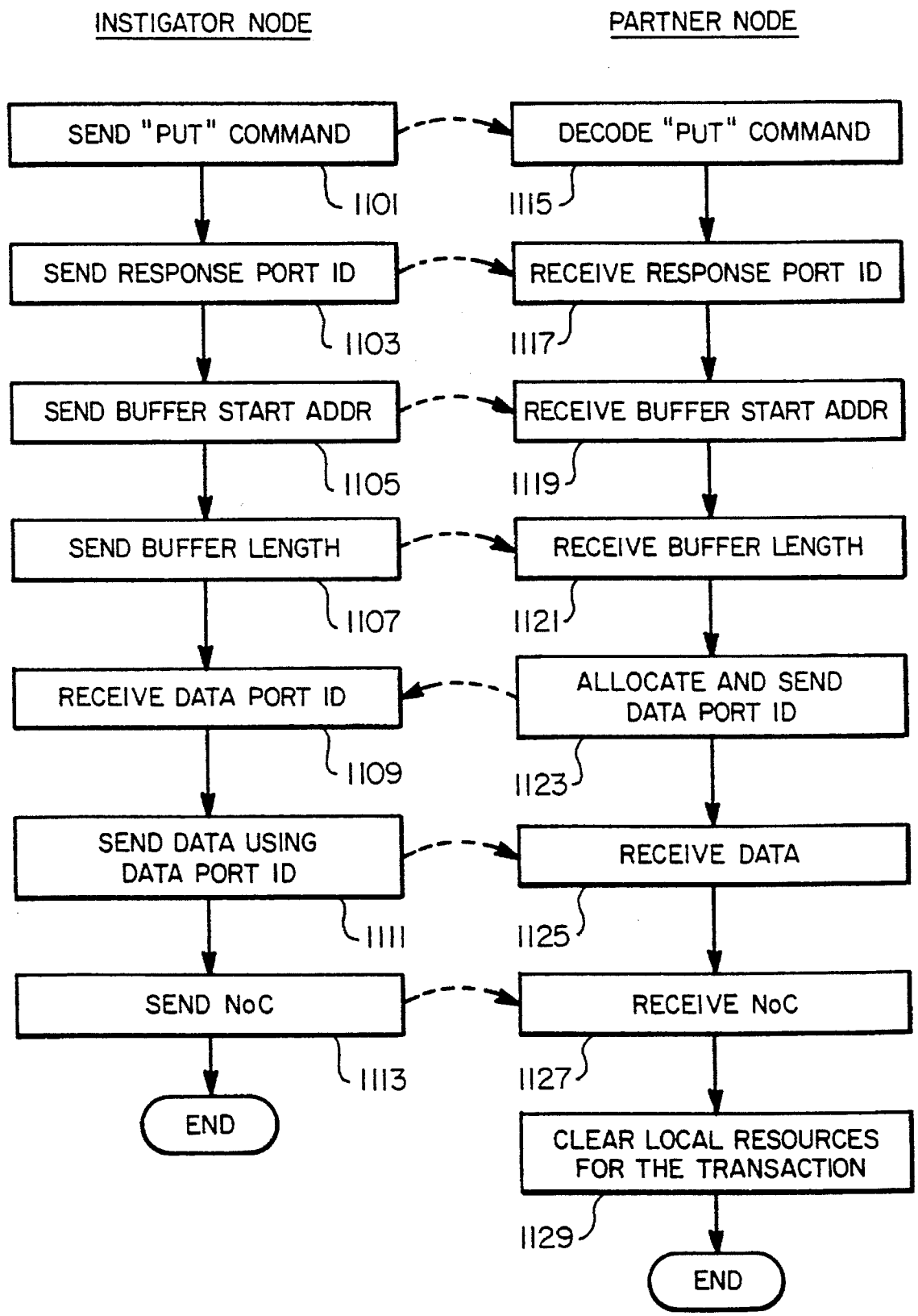
FIG_11

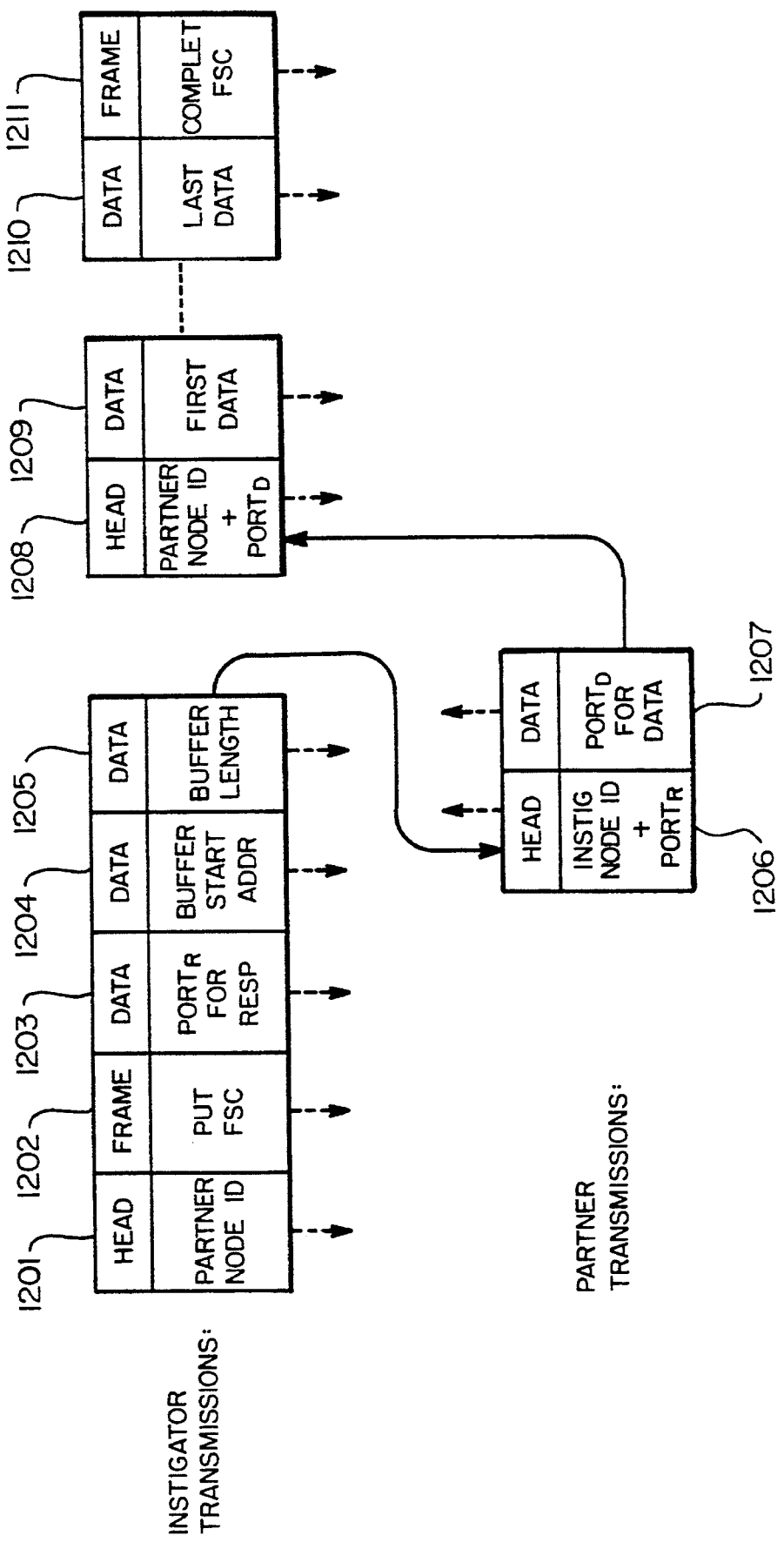
FIG_12

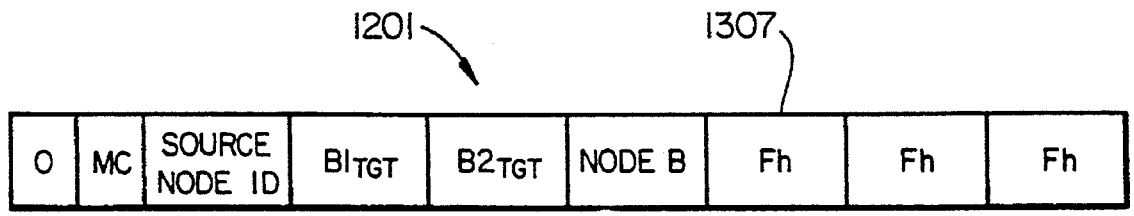
FIG_13a
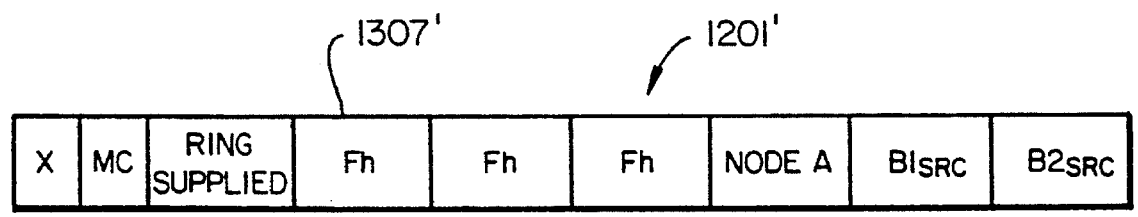
FIG_13b
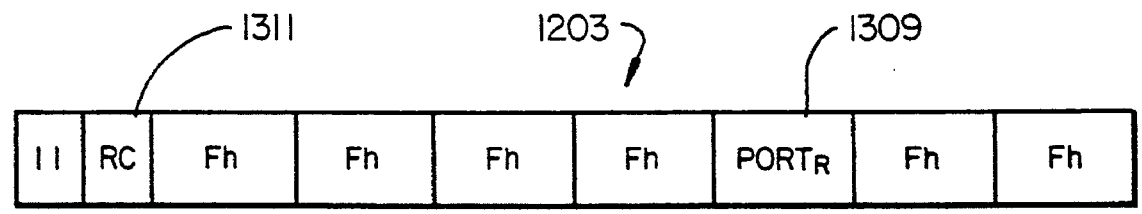
FIG_13c
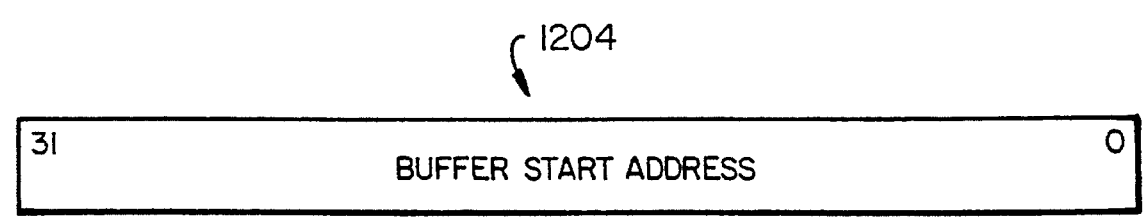
FIG_13d

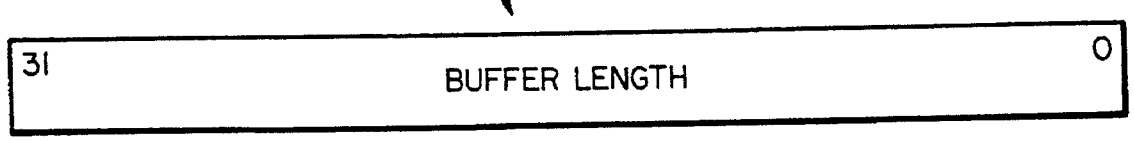
FIG_13e
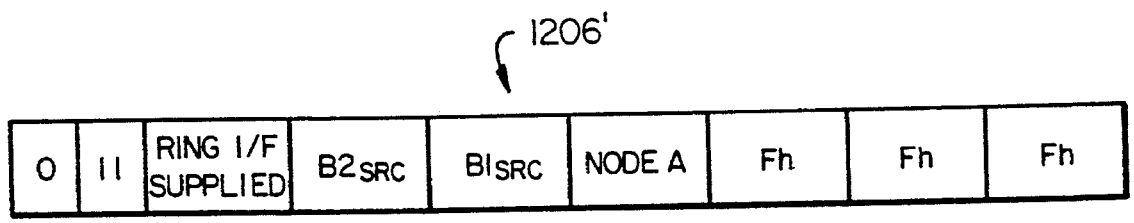
FIG_13f
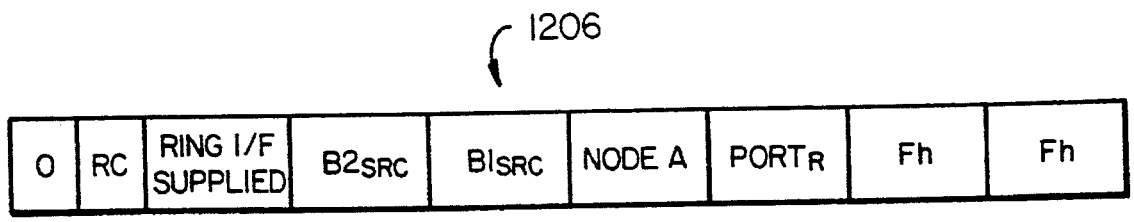
FIG_13g
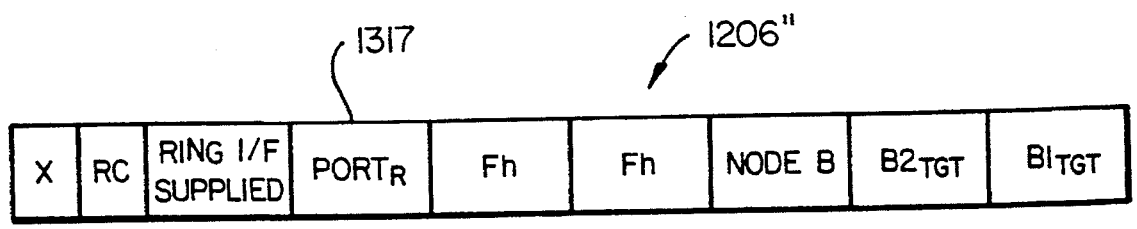
FIG_13h

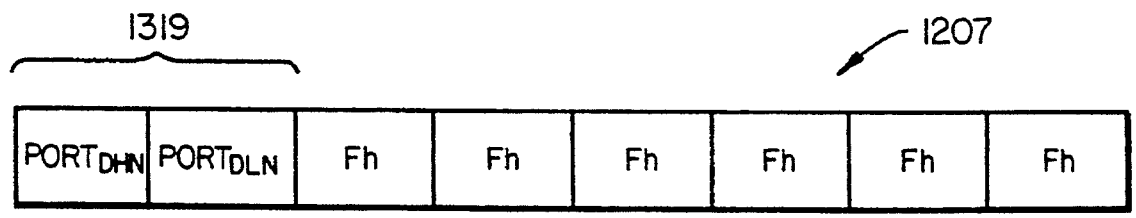
FIG_13i
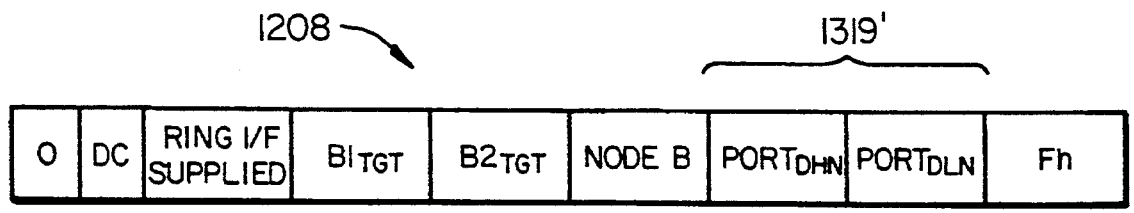
FIG_13j
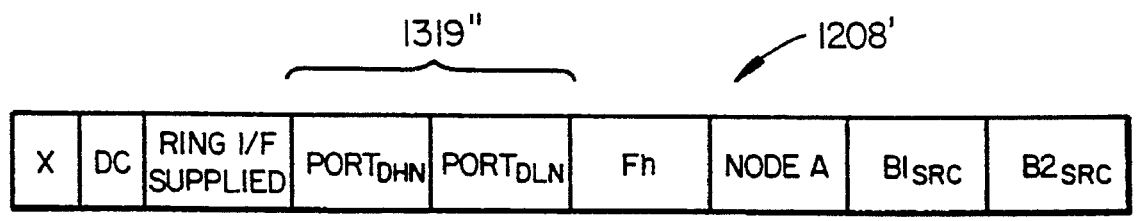
FIG_13k

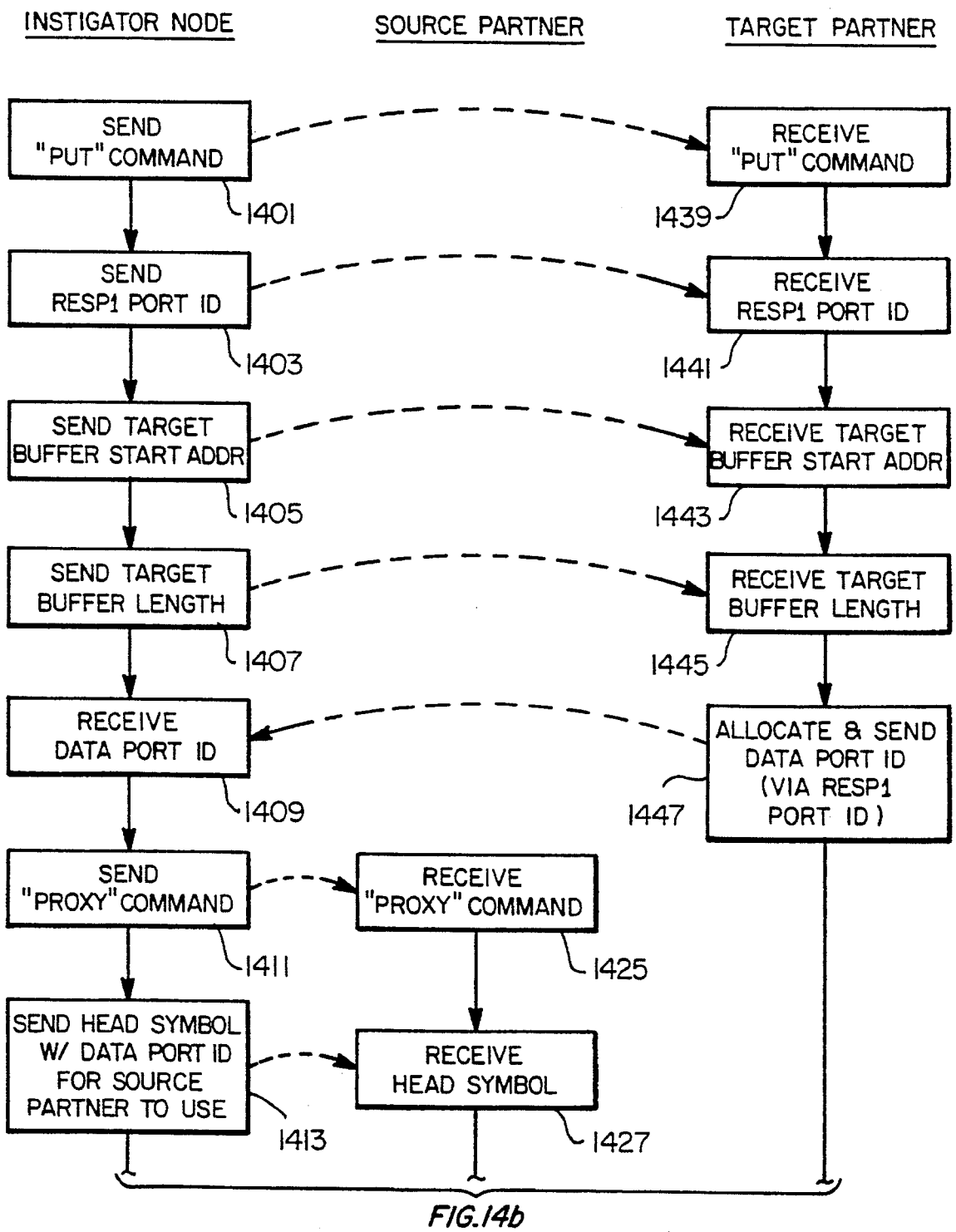
FIG_14a

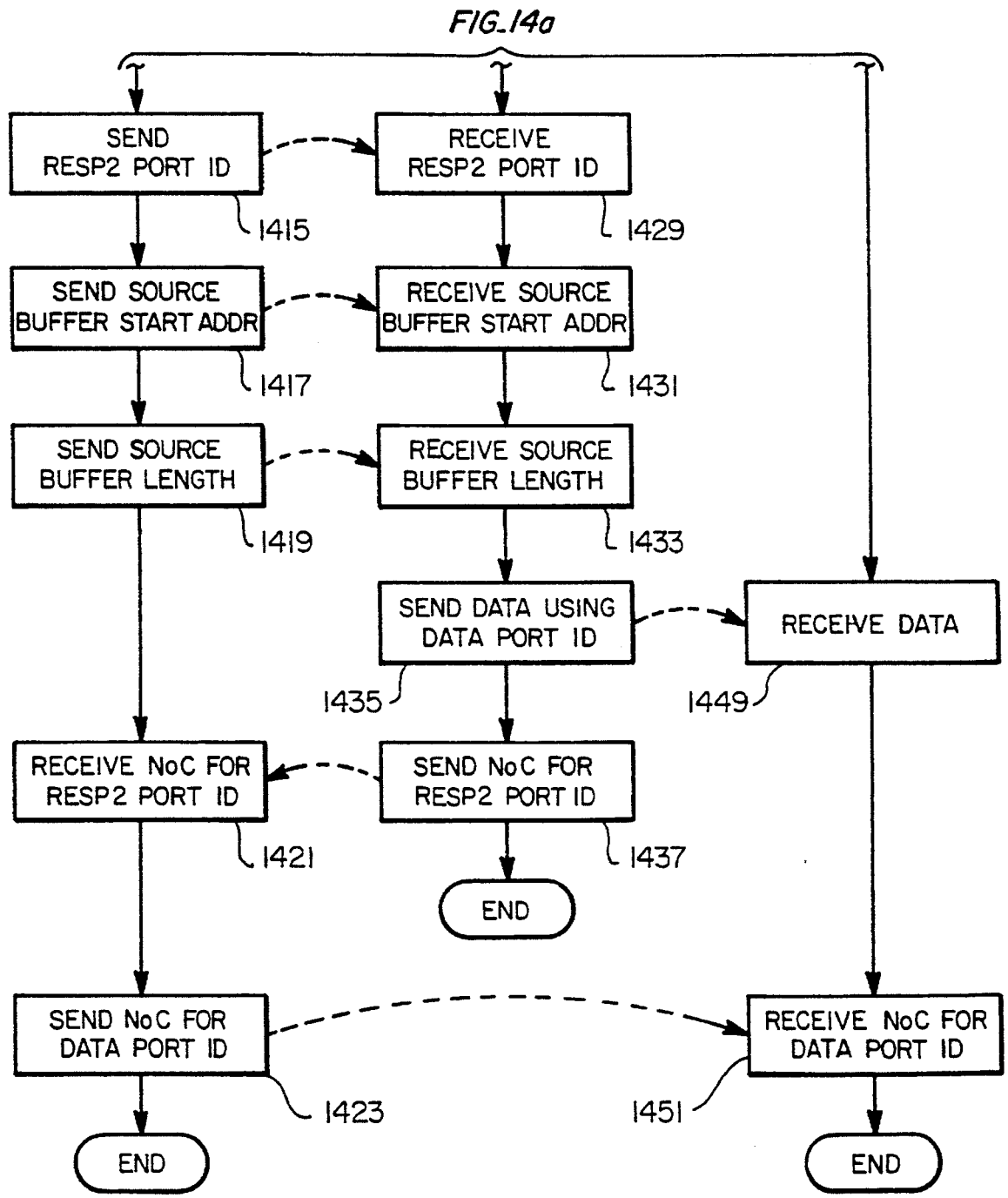
FIG_14b

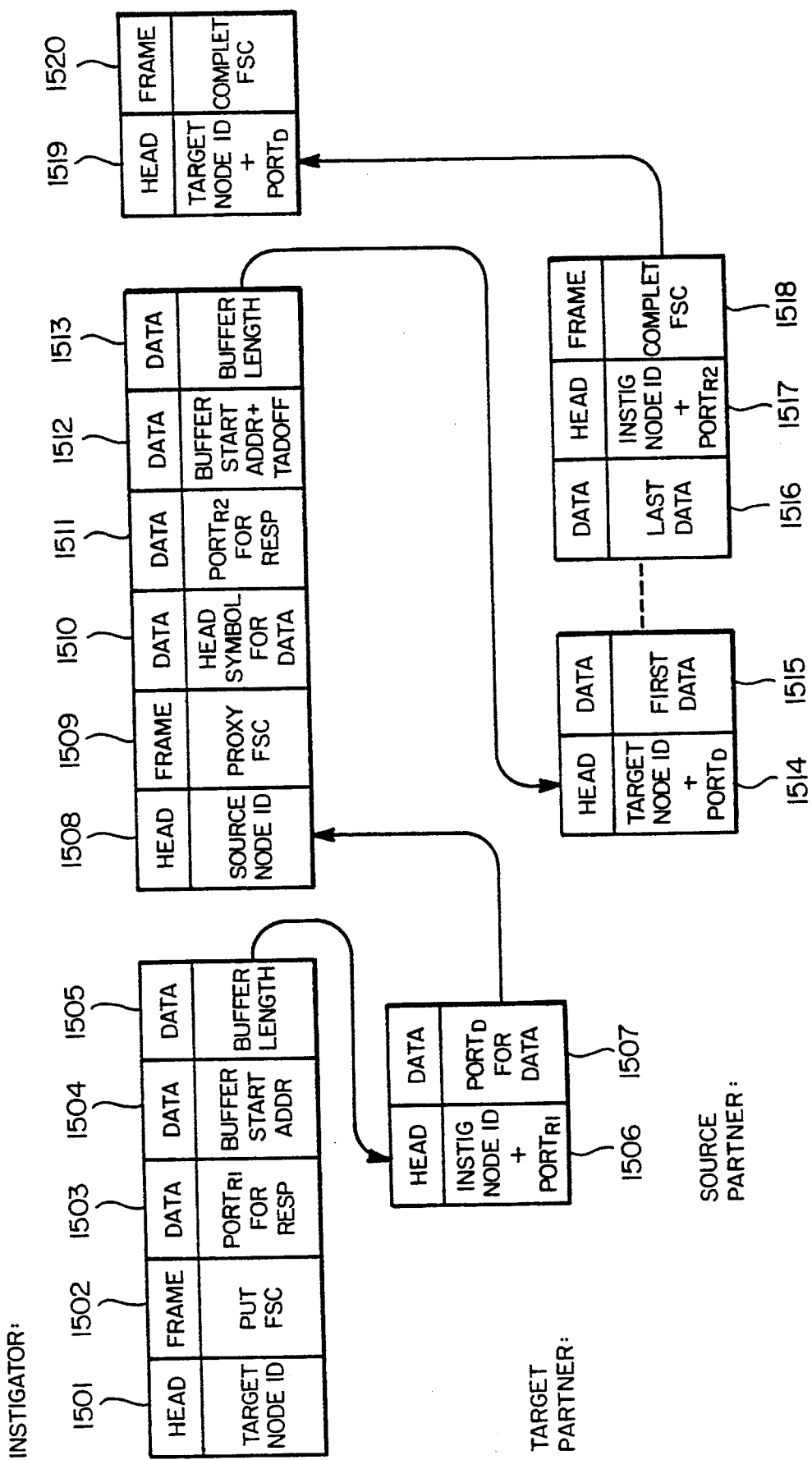

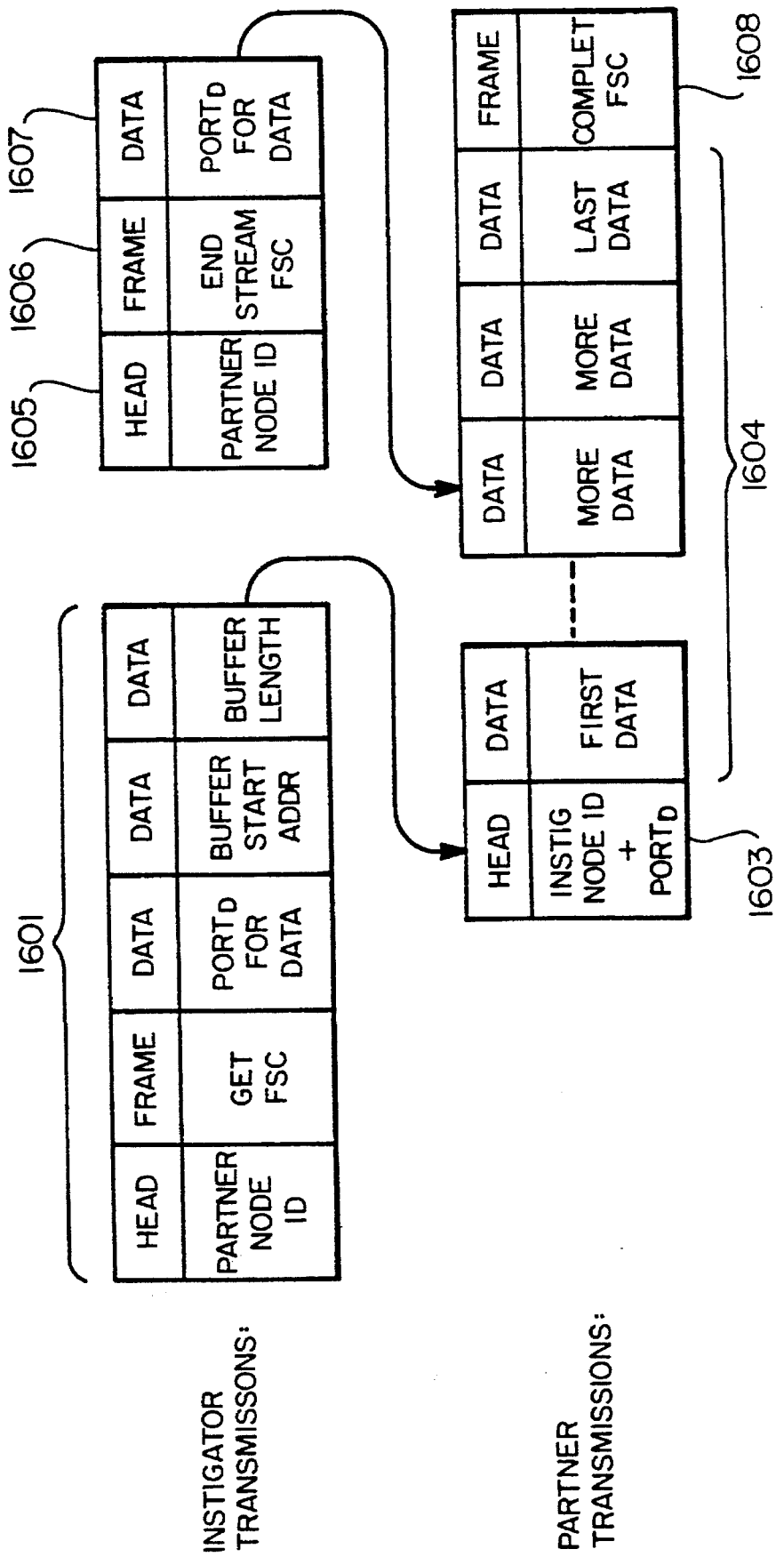
FIG_16

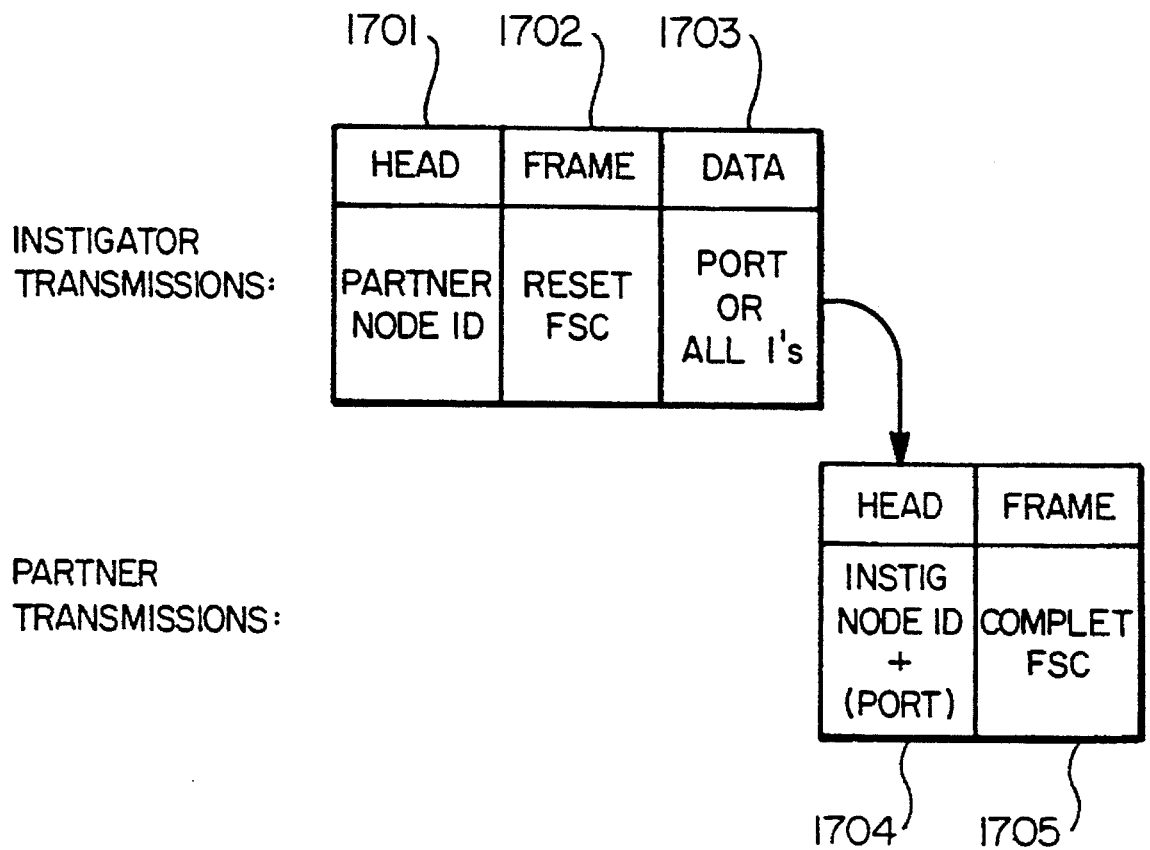
FIG_17
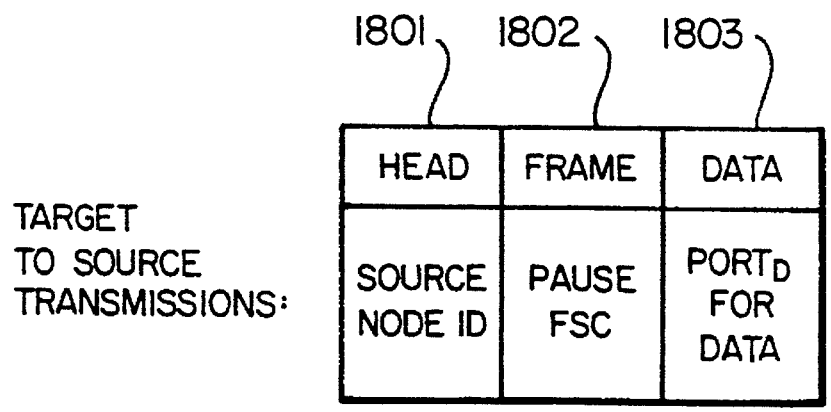
FIG_18

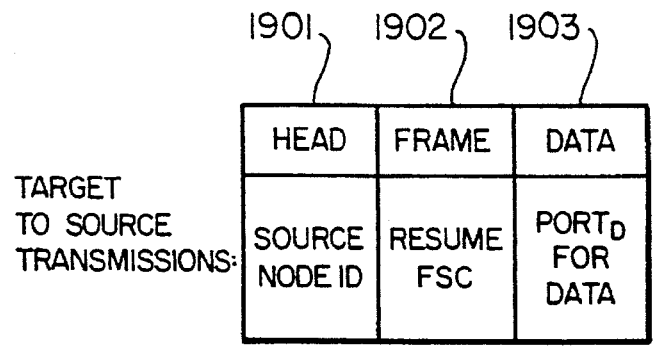
FIG_19
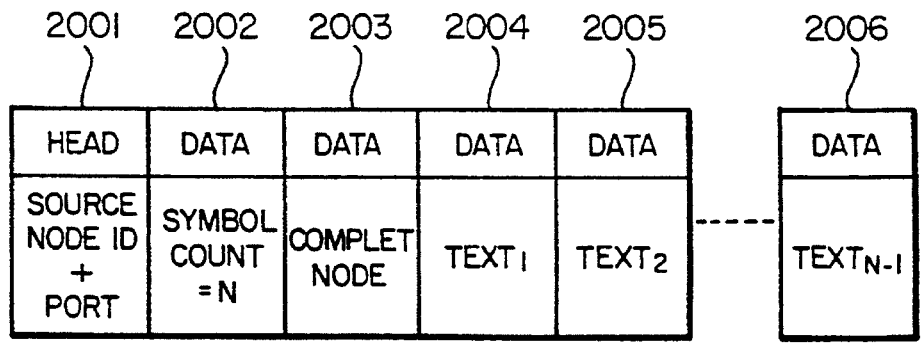
FIG_20
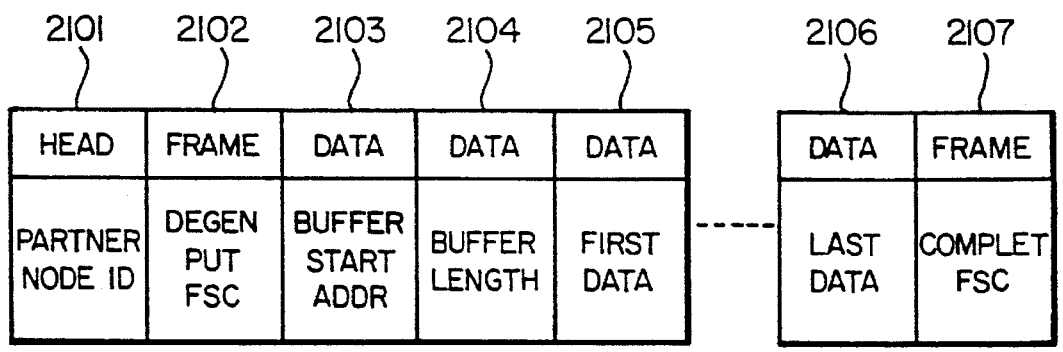
FIG_21

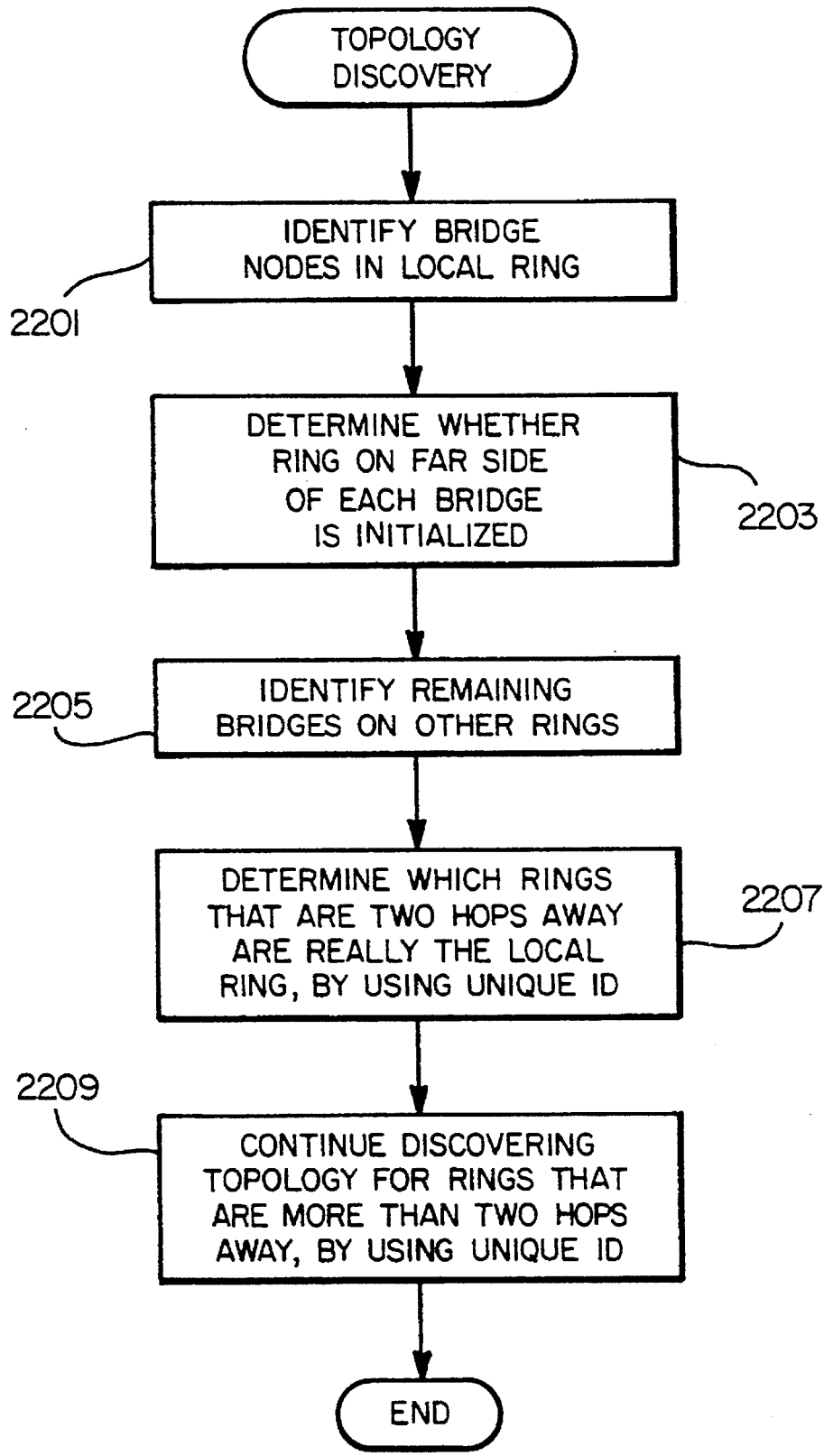
FIG_22

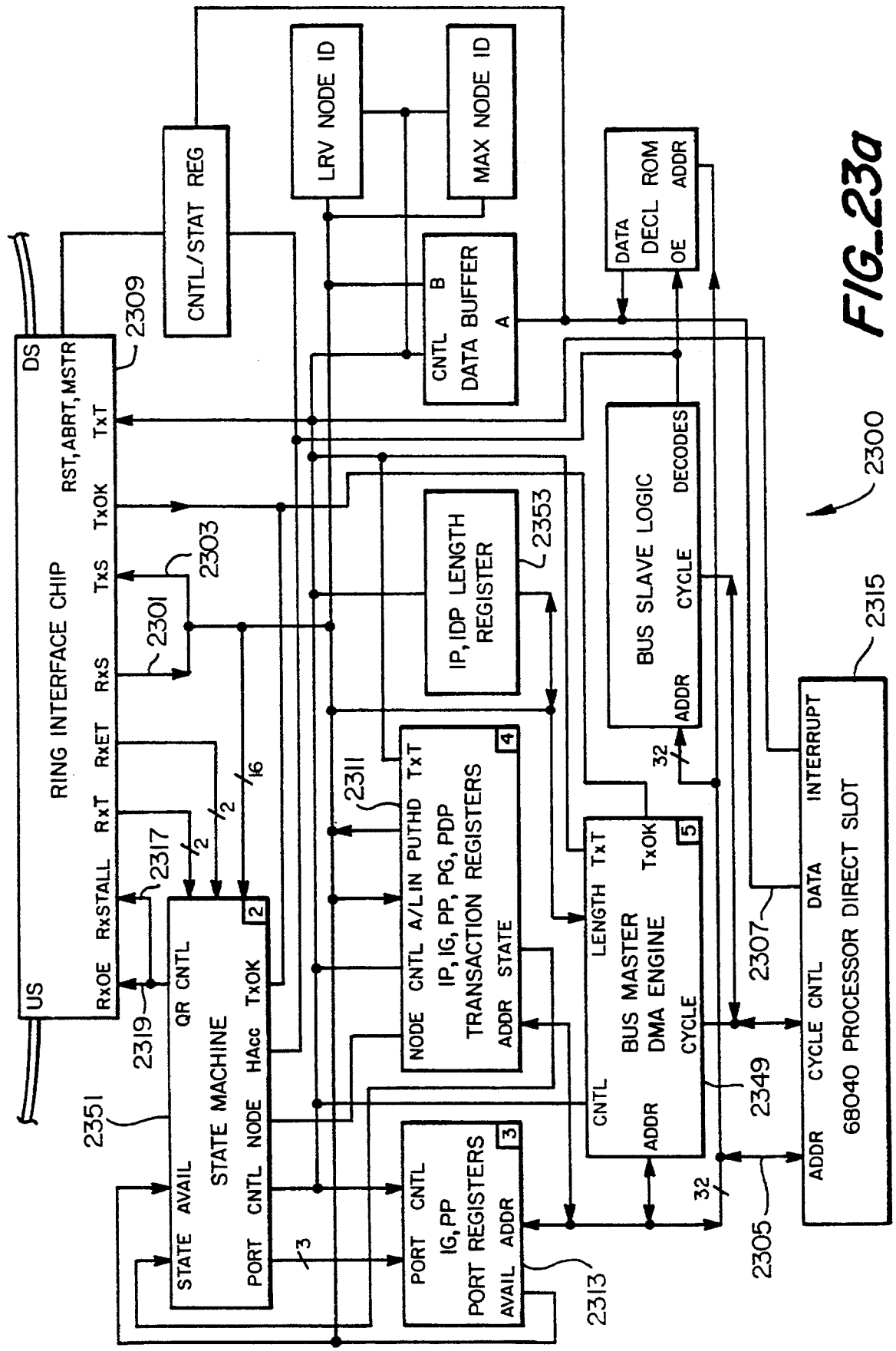
FIG._23a

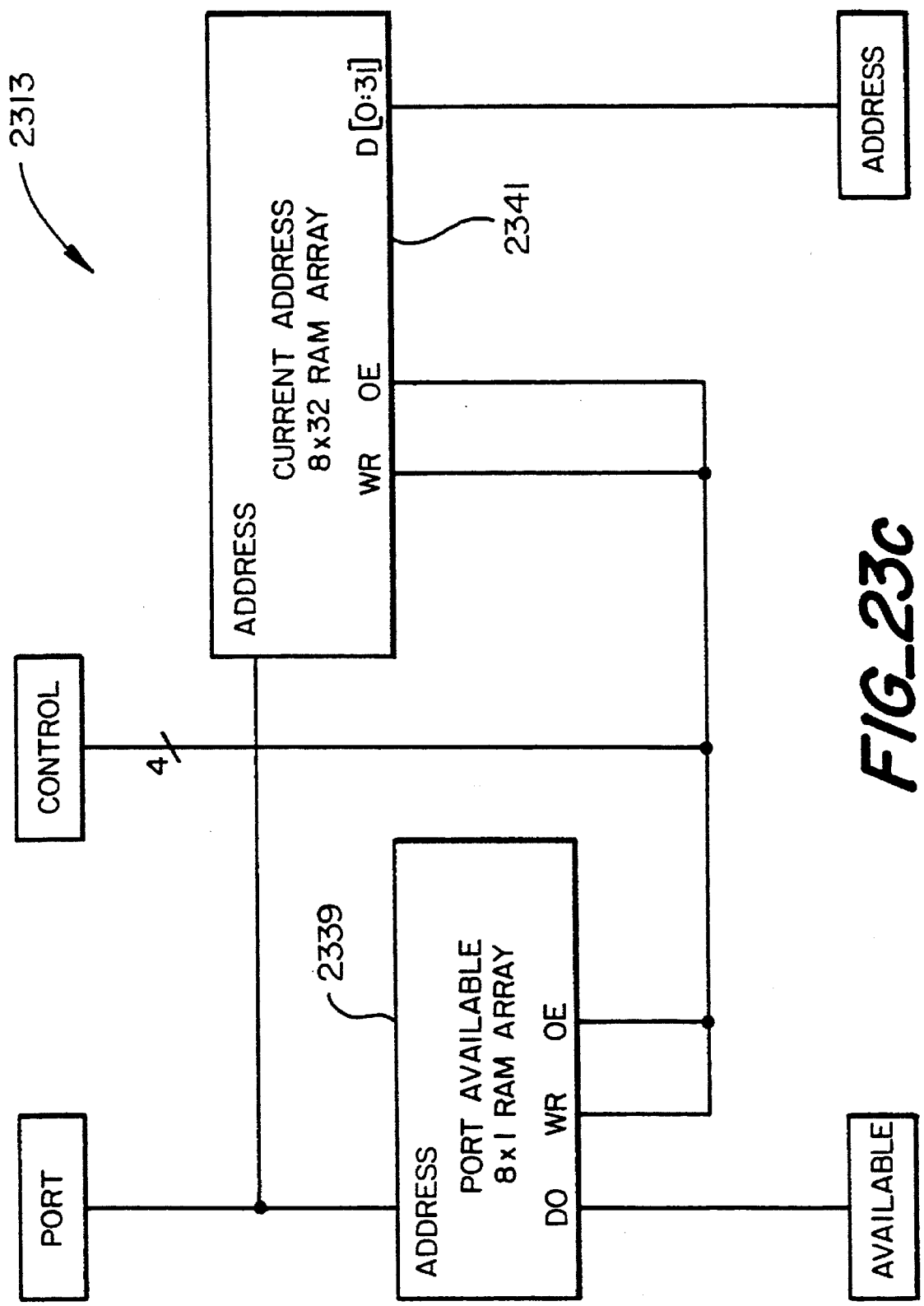
FIG_23c

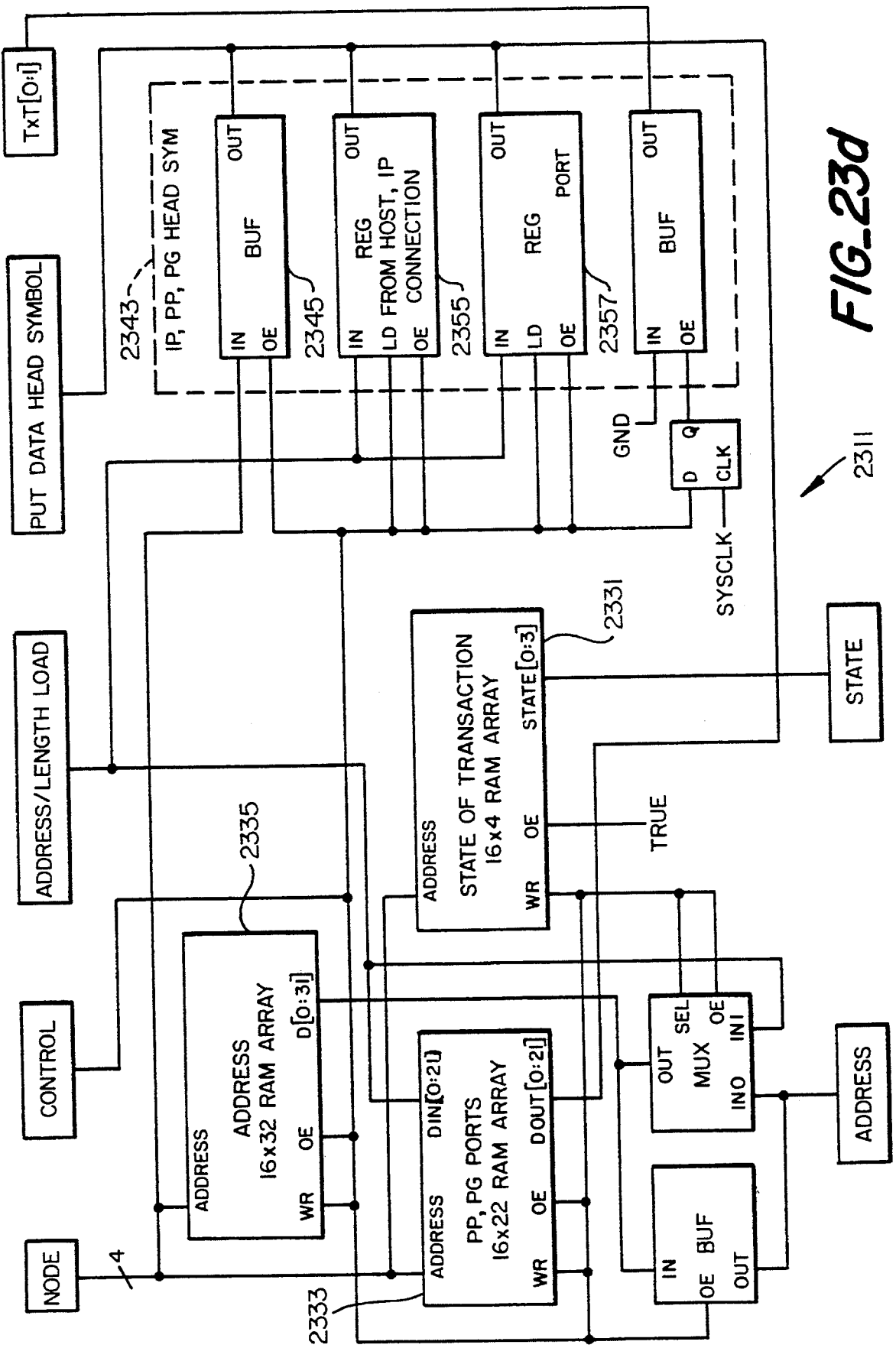
FIG_23d

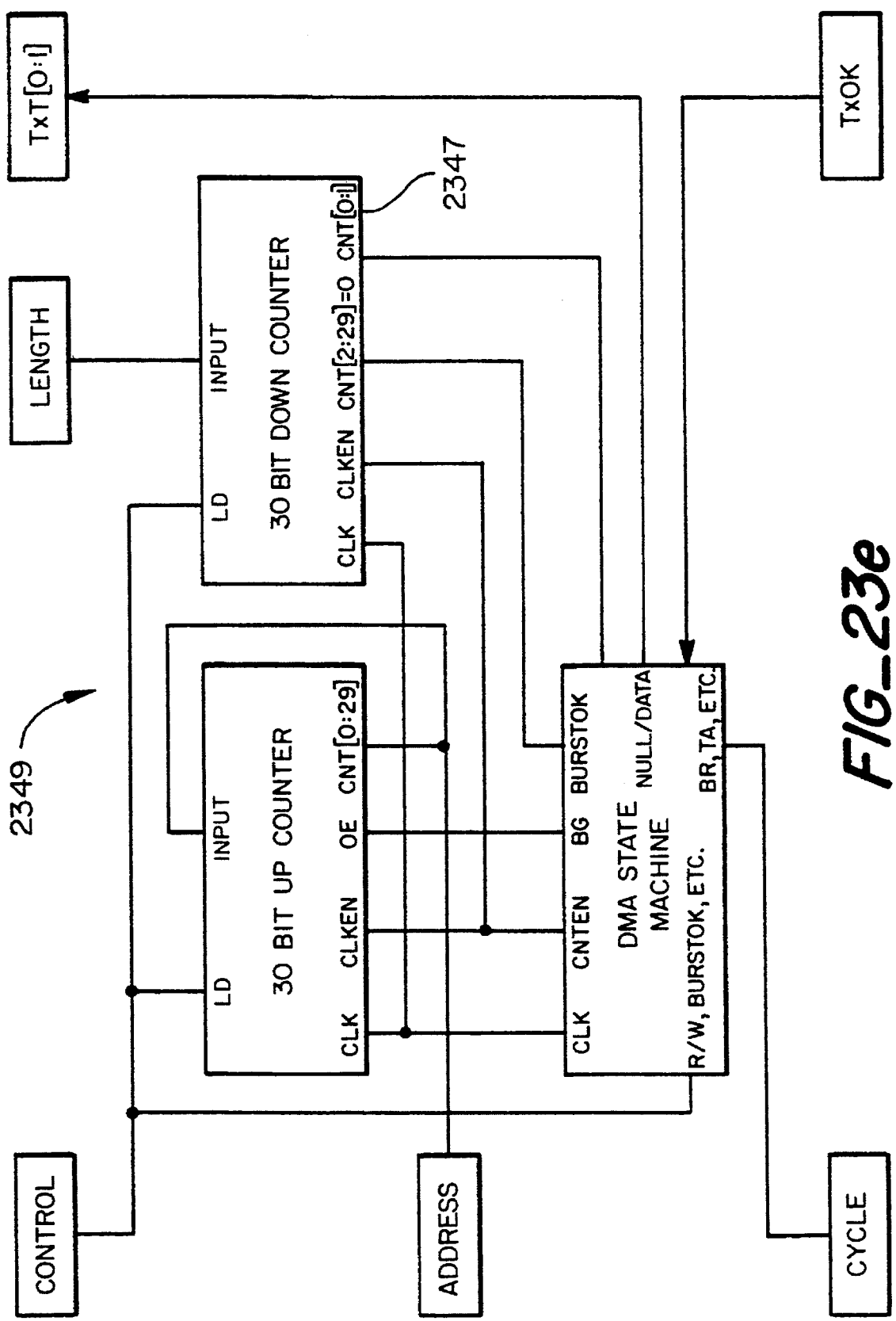
FIG_23e

LINK AND DISCOVERY PROTOCOL FOR A RING INTERCONNECT ARCHITECTURE

This application is a divisional of application Ser. No. 08/057,913, filed May 7, 1993, now U.S. Pat. No. 5,457,683.

BACKGROUND

The present invention relates to protocols suitable for use with interconnection circuitry, and more particularly to methods and apparatus for transferring data in a computer system having a plurality of data sources interconnected in the form of a ring, and for determining topology of interconnection, and determining information about each node.

A typical computer system comprises a number of components, each performing a particular function. For example, such a system might include a central processing unit, a random access memory, a frame buffer memory, output control and timing circuitry, an output display, and input/output circuitry. Those skilled in the art will recognize that this list is merely illustrative, and that many other types of components might also be incorporated into the system.

In a typical system as described, it is often necessary for data to be transferred from one component to another. Traditionally, this has been accomplished by connecting each of the system components to a plurality of conductors referred to as a system bus which may include an address bus, a data bus, and one or more control lines. In operation, a component such as the central processing unit transmits data to another component by placing the address to which the data is directed on the system address bus, and the data on the system data bus. While it is convenient to think of the data and addresses as numbers, in actuality they exist on the bus in the form of electrical signals which are imposed on the bus by the transmitting component, and sensed by all remaining components attached to the bus. Because these signals generally change with each new bus transaction, it is important that components not sense them before they have fully reached the values corresponding to the data and address for the next transaction. To implement this requirement, one or more control signals may be dedicated to indicating when the data and address on the bus are valid. In addition, another control signal or signals may provide information about the transaction, such as whether it is a read or write operation, and whether it is a memory or an input/output operation.

Returning to the scenario in which data and a corresponding address has been placed on the bus, the component for which the data is destined recognizes an address on the address bus within its range of addresses and accepts the data available on the data bus. All other components, recognizing that the address is not one of theirs, ignore the data and control signals on the bus.

Since each of the address and data buses is made up of a number of conductors which physically connect to each of the system components on the bus and all of the conductors of each bus carry the information that is being directed to one address, it is a characteristic of this system that during the time that any particular source of information is utilizing the buses, the buses are unavailable for use by any other source. Consequently, data may be sent by only one source at a time (although more than one destination may receive data if more than one destination can respond to the same address) since there is no room for information from more than one source at a time on the data or address buses.

In order to overcome the limits of a bus system, alternative methods of interconnection have been proposed which permit a plurality of component pairs to exchange data simultaneously. One such arrangement is a ring-type system, in which all components which would normally be connected to a bus are connected to only two other components in a unidirectional ring. Each component receives information from a first neighboring component on an "upstream" port, and sends information to a second neighboring component on a "downstream" port. Each component then forwards information around the ring until the information arrives at its destination, at which time the destination node, rather than sending the information further "downstream," gives the information to its associated component. Separating the interconnection into individual paths between components isolates the components from all but two other components but increases the amount of traffic which can be handled by the ring over the amount which may be placed on a system bus because a number of sources of information can communicate with a number of destinations at the same time. This occurs because the isolation allows one system component to send information to a second component while a third component sends information to a fourth component, and so on.

The ring interconnection architecture is typically used as a secondary connection between the components of a computer system. The primary connection between these components is usually a busing arrangement such as the NuBus manufactured and used by Apple Computer, Inc., in its line of Apple Macintosh II personal computers.

While a ring interconnection architecture provides the capability for a computer system to move data from one or more source nodes to one or more corresponding destination nodes, it does not inherently define a mechanism whereby a component associated with the destination node knows what to do with the received information. Such a mechanism, or protocol, is necessary in a computer system which typically interconnects a number of very different devices, each having individually defined interface operations.

Protocols exist for transferring information on computer networks. However, these existing protocols are inappropriate for conveying information in a ring interconnection architecture which is intended for use as a bus substitute [or supplement] for a number of reasons. To begin with, networking protocols are symmetric, in that the communicating devices must each be capable of performing complicated operations defined by the protocol. Thus, no allowances are made for communications between an intelligent device and a simple device having a simple architecture which is responsive to commands sent by the intelligent device.

Networking protocols are also inappropriate for connecting devices of various complexity because they require an intelligent bridge (usually called a router). Without this intelligent bridge, networking protocols will only function on a local network.

Another aspect of networking protocols which makes them inappropriate in the above-described ring interconnect architecture is the fact that these protocols shield the actual addressing and architecture of network components from one another. Thus, physical addresses of resources within a network component are not visible to any other network component. Consequently, access to such resources requires the mediation of intelligent software in the local node. Because the data arrives at the node without a map to physical addressing, it is often buffered so that the local processor can apply the protocol to the data and then move the data to the appropriate final location. This requirement limits the performance of the node to the performance of a processor running software and performing memory copies.

Additionally, network protocols often rely on broadcast capabilities (a message with one source and all other nodes as destination). However, not all of the contemplated ring interconnect architectures support this method of communication. Consequently, these types of network protocols would not function in the desired environment.

Another reason why existing network protocols are inappropriate for use in the above-described ring interconnect architecture is that these existing protocols typically will not operate without a significant amount of processor power, support hardware or both. This may be too large an investment for some low cost ring interconnection architectures.

SUMMARY

It is therefore an object of the present invention to provide a protocol for a ring interconnect architecture which defines data exchange operations between components associated with different nodes on the ring.

It is a further object of the present invention to provide a data exchange protocol that places the bulk of the processing task on the node that initiates a transaction, so that it supports relatively simple hardware in the partner device of a transaction.

It is an additional object of the present invention to provide a data exchange protocol which functions in a multi-ring interconnect architecture.

It is another object of the present invention to provide a transaction based mechanism for components associated with different nodes in a multi-ring interconnect architecture can identify one another.

It is yet another object of the present invention to provide a data exchange protocol which functions in a multi-ring interconnect architecture and includes a data stream identifier.

It is an additional object of the present invention to provide a mechanism for discovering the topology of a multi-ring interconnect architecture without the need to resort to intelligent bridges between rings.

The foregoing and other objects are achieved in accordance with the present invention, which comprises methods and apparatus for use in a system including a first node, a second node and, in some instances, a third node, each of the first, second and third nodes coupled to each other of the first, second and third nodes by means of a point to point packet-based communication system.

In accordance with one aspect of the present invention, a GET transaction is defined in which a variably determined quantity of data may be transferred from a source location starting at a starting address at the second node to the first node. This is achieved by sending a first packet from the first node to the second node, the first packet comprising a command symbol encoded to designate a predetermined command, an address symbol encoded to designate the starting address at the second node, and a buffer length symbol encoded to designate the variably determined quantity. Upon receiving this first packet containing the predetermined command, the second node responds by retrieving the variably determined quantity of data from the source location, and sending at least one second packet from the second node to the first node, the at least one second packet comprising the retrieved data.

In another aspect of the present invention, the first packet further includes a data port identifier allocated by the first node for this transaction. This data port identifier is then included with the at least one second packet. This enables the first node to identify which transaction, from among several, the incoming data is associated with. In a preferred embodiment, the data port identifier is located left justified in an unused area, normally utilized for conveying extended routing information, in the at least one second packet. This feature allows the first node to easily identify the location of the data port identifier within the at least one second packet.

In yet another aspect of the present invention, the variably determined quantity is an ongoing stream of data. In this case, the first node causes the second node to terminate the at least one second packet by using the point to point packet-based communication system to send a third packet from the first node to the second node, the third packet comprising a command symbol encoded to designate a second predetermined command. The third packet may also comprise the allocated data port identifier, in order to identify which ongoing stream, from among several, the first node wants terminated.

In still another aspect of the invention, a PUT transaction is defined in which a variably determined quantity of data may be transferred from the first node to a target location starting at a starting address at the second node. This is accomplished by sending a first packet from the first node to the second node, the first packet comprising a command symbol encoded to designate a predetermined command, an address symbol encoded to designate the starting address at the second node, and a buffer length symbol encoded to designate the variably determined quantity. The second node responds to the receipt of the predetermined command by allocating a data port identifier for this transaction, and using the point to point packet-based communication system to send a second packet from the second node to the first node. The second packet comprises the allocated data port identifier. The first node responds to receipt of the second packet by sending at least one third packet from the first node to the second node, the at least one third packet comprising the allocated data port identifier and the variably determined quantity of data. Then, in response to receipt of the at least one third packet, the second node stores, to the target location, the variably determined quantity of data contained in the at least one third packet.

In yet another aspect of the invention, the first and second packets further comprise a response port identifier allocated by the first node for this transaction. In the second packet, the response port identifier may be left justified in an unused area normally used for conveying extended routing information. Similarly, the allocated data port identifier may be left justified in an unused area normally used for conveying extended routing information in the at least one third packet.

In another aspect of the invention, the variably determined quantity is an ongoing stream. In this case, the second node, after storing received data at a last address of the target location, stores additional data contained in the at least one third data packet to the target location beginning at a first address of the target location. With this mechanism, an ongoing stream of data may be stored in a "window" at the second node, the window being repeatedly overwritten as each additional window's worth of data arrives.

In accordance with another aspect of the present invention, a PROXY transaction is defined in which a first (instigating) node can cause a variably determined quantity of data to be transferred from a source location starting at a first address at the second node to a target location starting at a second address at the third node. The point to point packet-based communication system is used to send a first packet from the first node to the third node, the first packet comprising a command symbol encoded to designate a first predetermined command, an address symbol encoded to designate the second address at the third node, and a buffer length symbol encoded to designate a quantity of third node data units corresponding to the variably determined quantity. The third node responds to the receipt of the first predetermined command by allocating a data port identifier for this transaction, and using the point to point packet-based communication system to send a second packet from the third node to the first node, the second packet comprising the allocated data port identifier. The first node then responds to receipt of the second packet by sending a third packet from the first node to the second node, the third packet comprising a command symbol encoded to designate a second predetermined command, a data symbol encoded to provide information for routing a packet from the second node to the third node, the allocated data port identifier, an address symbol encoded to designate the first address at the second node, and a buffer length symbol encoded to designate the variably determined quantity. The second node responds to receipt of the second predetermined command by retrieving the variably determined quantity of data from the source location and using the point to point packet-based communication system to send at least one fourth packet from the second node to the third node, the at least one fourth packet comprising the allocated data port identifier and the retrieved variably determined quantity of data. The third node responds to receipt of the at least one fourth packet by storing, to the target location, the variably determined quantity of data contained therein.

In another aspect of the invention, each of the first and second packets further comprises a response port identifier allocated by the first node for the transaction. The response port identifier may be left justified in an unused area of the second packet that is normally utilized for conveying extended routing information. Similarly, the allocated data port identifier is left justified in an unused area of the at least one fourth packet that is normally utilized for conveying extended routing information.

In still another aspect of the invention, the variably determined quantity is an ongoing stream, and the third node, after storing received data at a last address of the target location, begins storing additional data contained in the at least one fourth data packet at a first address of the target location. This allows an ongoing stream of data to repeatedly overwrite a defined window at the third node.

In yet another aspect of the invention, the variably determined quantity is an ongoing stream, and the third packet further comprises a second response port identifier that is allocated by the first node. The first node causes the second node to terminate the at least one fourth packet by using the point to point packet-based communication system to send a fifth packet from the first node to the second node, the fifth packet comprising the allocated second response port identifier and a command symbol encoded to designate a third predetermined command.

In another aspect of the present invention, a node in a packet communication system having a ring interconnect architecture may determine the topology of the system. The ring interconnect architecture comprises at least one ring, each ring comprising at least one node selected from the group comprising leaf nodes and bridge nodes. Each leaf node has a node identifier not shared by any other node on a same ring and a readable data source at a known address. Each bridge node is uniquely associated with a far side bridge node coupled to a far side ring. A packet received by a bridge node is delivered to the associated far side bridge node for placement on the far side ring only if the packet does not designate the bridge node as a final destination. In the event that a packet designates a bridge node as a final destination, that packet is discarded by the designated bridge node. The topology discovery is accomplished by sending a packet from an instigator node (the discovering node) to a first known node on a first ring, the packet being encoded to solicit a first unique identifier stored at the first known node. A GET transaction may be used to solicit such data. In a preferred embodiment, the known node is the node having a node identifier equal to zero. The instigator node then receives a packet containing the first unique identifier. Next, the instigator node sends a packet to the first known node, the packet being encoded to solicit node identifiers of all nodes on the first ring. Then, the instigator node receives a packet containing the solicited node identifiers of all nodes on the first ring.

Using the node identifiers of all nodes on the first ring, the instigator node sends a packet to each node on the first ring, wherein the packet is encoded to solicit data from the readable data source of a partner node. When a partner node sends the solicited data to the instigator node, the solicited data is accompanied by a partner node identifier, so that the instigator node can ascertain which other node responded. The instigator node then waits for solicited data to return.

If solicited data is received by the instigator node from a responding node, then the instigator identifies the responding node having the accompanying partner node identifier as a first ring leaf node in the first ring. However, if solicited data is not received from a nonresponding node within a predetermined time period, then the instigator identifies the nonresponding node as a first ring bridge node in the first ring, the first ring bridge node being associated with a far side bridge node in a second ring.

Next, for each identified first ring bridge node, the instigator node sends a packet from the instigator node through the identified first ring bridge node to a second known node on the second ring, the packet being encoded to solicit identifiers of all nodes on the second ring. The instigator node then receives a packet containing the solicited node identifiers of all nodes on the second ring.

For each identified first ring bridge node, the instigator node sends a second packet through the identified first ring bridge node to each node on the second ring. The second packet is encoded to solicit data from the readable data source of a partner node. When a partner node sends the solicited data to the instigator node, the solicited data is accompanied by a partner node identifier.

The instigator node waits for solicited data to return. If solicited data is received by the instigator node from a responding node, then the instigator node identifies the responding node having the accompanying partner node identifier as a second ring leaf node in the second ring. If solicited data is not received from a nonresponding node within a predetermined time period, then the instigator node identifies the nonresponding node as a second ring bridge node in the second ring, the second ring bridge node being associated with a far side bridge node in a third ring.

Then, for each identified second ring bridge node, the instigator node sends a packet through the identified second ring bridge node to a third known node on the third ring, the packet being encoded to solicit a third unique identifier stored at the third node. The instigator node subsequently receives a packet containing the solicited third unique identifier. The instigator node then determines whether the second ring bridge node is the associated far side bridge node of the first ring bridge node by determining that the first unique identifier is the same as the third unique identifier.

BRIEF DESCRIPTION OF THE DRAWINGS

The objects and advantages of the invention will be understood by reading the following detailed description in conjunction with the drawings in which:

FIG. 1 is a block diagram of a computer system utilizing a ring architecture instead of a traditional system bus.

FIG. 2, a block diagram of a node in accordance with the present invention.

FIGS. 3a–3b depict the formats for head symbols used in the present invention.

FIG. 4 is a block diagram of a multiple-ring topology.

FIG. 5 shows a preferred embodiment of a bridge node.

FIGS. 6a–6c show the encoding of a head symbol, and how it is transformed as it traverses a multi-ring network.

FIG. 7 is a flow diagram of a GET operation in accordance with the present invention.

FIG. 8 depicts a preferred implementation of the sequence of symbols associated with the GET command.

FIGS. 9a–9h show an example of transmitted symbols associated with a GET transaction.

FIG. 10 shows a preferred encoding scheme for a frame symbol defined by the present invention.

FIG. 11, a flow diagram of a PUT operation in accordance with the present invention.

FIG. 12 depicts a preferred implementation of the sequence of symbols associated with the PUT command.

FIGS. 13a–13k show an example of transmitted symbols associated with a PUT transaction.

FIG. 14 is a flow diagram of a PROXY operation in accordance with the present invention.

FIG. 15 shows a preferred implementation of the sequence of symbols associated with the PROXY command.

FIG. 16 illustrates the sequence of symbols associated with performing a GET to a streaming data source.

FIG. 17 shows the sequence of symbols associated with a Reset transaction in accordance with the present invention.

FIG. 18 shows the sequence of symbols associated with a Pause operation in accordance with the present invention.

FIG. 19 depicts the sequence of symbols associated with a Resume operation in accordance with the present invention.

FIG. 20 shows the format of a packet that is issued by a target node in response to receiving an AckNoC packet.

FIG. 21 depicts the symbol sequence associated with a Degenerate PUT operation, in accordance with the present invention.

FIG. 22 is a flow diagram of an algorithm used by a node for discovering multi-ring topologies, in accordance with the present invention.

FIGS. 23a–23e are block diagrams of one implementation of a node, designed in accordance with the present invention, for interfacing a Motorola 68040 microprocessor to a ring.

DETAILED DESCRIPTION

Figure 23B:
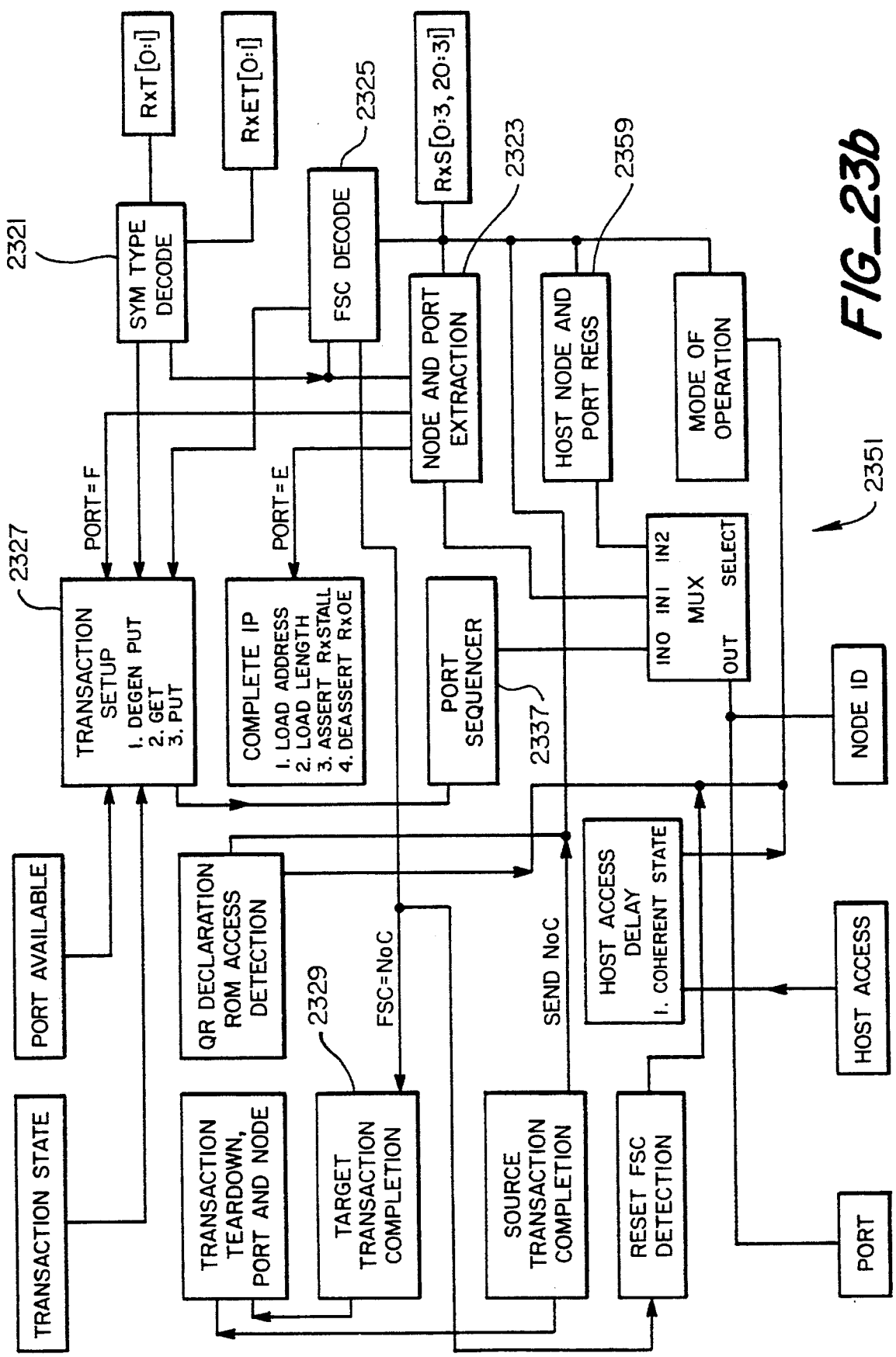

The present invention will be described with reference to ring and multi-ring interconnect architectures implemented by means of the QR0001 QUICKRING™ DATA STREAM CONTROLLER INTERFACE, manufactured by National Semiconductor, and described in their corresponding data sheet, which is hereby incorporated by reference. A data stream controller interface is also the subject matter of U.S. Pat. No. 5,165,024, entitled INFORMATION TRANSFER AND RECEIVING SYSTEM WITH A RING INTERCONNECT ARCHITECTURE USING VOUCHER AND TICKET SIGNALS, P. Sweazy, filed Apr. 12, 1990, and assigned to the assignee of this invention; U.S. Pat. No. 5,165,019, entitled RING INTERCONNECT SYSTEM ARCHITECTURE, P. Sweazy, filed May 29, 1990, and assigned to the assignee of this invention; and U.S. patent application Ser. No. 07/530,096, entitled IMPROVED RING INTERCONNECT SYSTEM ARCHITECTURE, and assigned to the assignee of this invention. The entire disclosures of these two patents and the patent application are hereby incorporated by reference. It will be apparent to one skilled in the art, however, that the various aspects of the invention described herein are equally applicable to any ring interconnect architecture which operates in a fashion similar to the one illustrated here.

Referring now to FIG. 1, a block diagram of a computer system utilizing a ring architecture instead of a traditional system bus is shown. A component 103 is coupled to a node 101 by means of a client receive port 125 and a client transmit port 127. Together, the client receive port 125 and the client transmit port 127 may be referred to as the client interface 133. A component may cause data to be placed on the ring 100 by transferring the data to the component's corresponding node at the client transmit port.

An upstream receive port 129 of the node 101 is coupled to receive information from node 121, and a downstream transmit port 131 of node 101 is coupled to transmit information to a corresponding upstream receive port (not shown) belonging to node 105. Each of the nodes 101, 105, 109, 113, 117, 121 is similarly coupled to receive information from an upstream node and to transmit information to a downstream node, so that information flows in only one direction through the ring until it arrives at its destination. When data arrives at a destination, it is made accessible to the corresponding component at the client interface 133. In a preferred embodiment of the present invention, each of the nodes 101, 105, 109, 113, 117, 121 contains a QR0001 QUICKRING™ DATA STREAM CONTROLLER INTERFACE chip for providing physical access to the respective upstream and downstream nodes. Each of the nodes 101, 105, 109, 113, 117, 121 also contains additional circuitry to implement the various features described herein. Details for implementing this additional circuitry will be readily apparent to those skilled in the art upon reading the functional description provided here. Therefore, these details will not be further expounded upon.

The described ring arrangement overcomes the limitations of a traditional busing arrangement, in which each component is connected to a common bus. Although the ring configuration separates the interconnection into individual paths between components, and thereby isolates the components from all but two other components, the amount of traffic that can be handled increases, compared to a system bus, because a number of sources of information can communicate with a number of destinations at the same time. Also with respect to speed, because there are always two and only two devices on any physical wire, electrical impedances are controlled. This allows higher clock rates to be used with the same component quality. Furthermore, the ability to expand interconnection by means of bridges has no equivalent in a bus architecture.

Each of the nodes 101, 105, 109, 113, 117, 121 thus includes apparatus (e.g. the QR0001 chip) for receiving information from and transferring information to the associated one of the system components 103, 107, 111, 115, 119, 123. When the associated system component desires to transfer information to another system component, it causes the associated node to generate the necessary signals to convey that information to the node associated with the other system component.

In this description, the following definitions are used. A symbol is any quantity of data that can be transferred on a parallel data path during one clock cycle. A stream is a logically-contiguous sequence of data symbols of arbitrary length. A packet is a portion of a stream consisting of one head symbol followed by any combination of one or more data or frame symbols. The first symbol in a packet of information is thus a head symbol and the remaining symbols comprise data and frame symbols. Bits which accompany each symbol indicate the type of symbol (i.e., head, data or frame) it is. Each head symbol used with the ring interconnect includes bits which identify its source node, its target node, the stream with which it is associated, and its level of urgency.

It should be readily apparent that a computer system as described above is a hybrid of a bus architecture and a computer network architecture. From a systems level, the use of a ring architecture for interconnecting computer system components differs from a traditional computer bus architecture in two critical ways:

1. Data does not travel with an address as it goes from the source node to the destination node. This is resolved, in accordance with the present invention, by means of the protocol defined below.
2. The data source always creates the cycle in which data is transferred. There is no atomic cycle comparable to a traditional bus read cycle, in which control is in the hands of the data destination, or target.

From a systems level, the use of a ring architecture for interconnecting computer system components also differs from a traditional computer networking interface in two critical ways:

1. Data is carried on a parallel path (32-bits wide, in a preferred embodiment) and often will not be buffered before it is used, so that issues of byte alignment between the data source and the data sink and byte ordering arise at the hardware level.
2. Because the ring architecture is a replacement for the traditional system bus, a protocol for use on the ring cannot require that each node be equally capable of performing the necessary operations associated with the protocol. The presence of nodes associated with simple devices having simple architectures must be accommodated. Thus, the ring architecture cannot require that every node implement timers, robust error recovery, rate control, cyclic redundancy check (CRC) calculation and other mechanisms that are found in computer networks.

To emphasize the unique character of the present computer system ring architecture, the following terminology will be used to describe operations. An instigator is a node which initiates a data transaction. A partner is a node that participates in a transaction with an instigator. A source is a node which receives data from its client transmit port 127, and places this data on its downstream transmit port for transmission on the ring. A target is a node which is the intended recipient of data received on its upstream receive port 129. This data is then transferred to a corresponding component via the client receive port 125.

In accordance with the present invention, three basic transaction types are defined for use in the ring protocol: PUT, GET, and PROXY.

In a PUT operation, the source is the instigator. It moves a data buffer from its local environment of its node to the target's local environment. It is important to note that the instigator of the PUT operation specifies the destination address of the data in the partner's local environment, and is therefore analogous to a write cycle in traditional bus systems.

In a GET operation, the target is the instigator. It requests that a data buffer be sent from the source's local environment to its environment. It is important to note that the instigator of the GET operation specifies the source address of the data in the partner's local environment, and is therefore analogous to a read cycle in traditional bus systems.

In a PROXY operation, the instigator neither transmits nor receives data, but instead merely orchestrates the data transaction. The instigator informs the target where to place the data in the target's local environment and informs the source where to obtain the data in the source's local environment.

Any of the above data transfer operations may perform a block data transfer (i.e., a transfer of a predetermined amount of data), or a stream data transfer (i.e., a transfer of data, the amount of which is not known before the transfer begins). In most implementations, it will be desirable to support multiple streams in the connection between two particular nodes. For example, a situation may arise in which node A initiates a GET in order to retrieve a first stream of data from node B, while at the same time node B initiates a PUT in order to write a second stream of data into node A. Thus, both the first and second data streams will be arriving at node A. Because the ring interconnect architecture permits simultaneous streams of data to arrive at a node in a multiplexed fashion, it is necessary, in this example, that node A be able to identify whether a received data symbol is part of the first stream of data, or whether it is part of the second stream of data. For this reason, each transfer of data will be associated with a port number, which identifies the particular transaction to which the data corresponds. Further details about the generation and transmission of the port number are presented below in connection with discussions of individual data transfer operations defined in accordance with the present invention.

Supporting Hardware in Preferred Embodiment

Before presenting a complete description of the preferred implementation of the protocol that is defined in accordance with the present invention, pertinent information about the operation of the ring interconnect hardware will be presented. Referring now to FIG. 2, a block diagram of a node 201 is depicted. In the preferred embodiment, the node 201 consists of a data stream controller interface 203, henceforth referred to simply as a ring interface 203, coupled to the protocol hardware 205. The ring interface 203 is preferably the QR0001 chip manufactured by National Semiconductor. The ring interface 203 has an upstream receive port 207 and a downstream transmit port 209 for connection to the ring. On the client side of the ring interface 203 are two outputs: receive symbol port 211 and receive type port 213. The client side of the ring interface 203 also has two inputs: transmit symbol port 215 and transmit type port 217. In the preferred embodiment, all transmitted and received symbols are 32 bits wide.

It will be recalled that there are three types of symbols that a component can place on the ring: head, data, and frame. On the client side of the ring interface 203, it is important to convey information relating to the fact that no symbol is being transmitted during a particular cycle. Consequently, the client side of the ring interface 203 defines the following four types of symbols: head, data, frame, and null. The type of symbol that is received from the ring or transmitted to the ring is encoded in a two-bit field which is output/input from/to the respective receive type port 213 and transmit type port 217.

In operation, when the protocol hardware 205 wishes to begin transmission of a data stream, it first writes a head symbol to the transmit symbol port 215. From then on, every payload symbol (either data or frame) sent to the transmit symbol port 215 is assumed to belong to the stream identified by the head. The data stream that the client writes at the transmit symbol port 215 is unbounded. However, if a new head is written to the transmit port, the data stream that follows is associated with the new head. If at any time the protocol hardware 205 is not prepared to transmit either a payload or a new head, a null symbol may be introduced in to the transmit data stream by presenting the two-bit code for null symbol at the transmit type port 217.

Logically distinct data streams can be multiplexed together and loaded into the transmit symbol port 215. The protocol hardware 205 is free to switch between source streams at its convenience, as long as it introduces a new head when the switch occurs.

At the receive port, many different streams can be multiplexed together. Every switch to a new stream context is marked by a new head symbol. It is possible that the multiplexed stream that is loaded into a ring interface 203 at a source node may be different from the multiplexed stream that arrives at the target node.

As previously mentioned, two types of payload symbols are indicated at the client side of the ring interface 203: data symbols and frame symbols. However, their distinction is only of interest to the protocol hardware 205. The ring interface 203 does not distinguish between them, except to preserve their identity. Thus, the fact that a symbol is designated as a frame symbol, as opposed to a data symbol, is of significance only to the protocol hardware 205.

The ring interface 203 of the preferred embodiment defines the formats for head symbols as shown in FIGS. 3a and 3b. Referring first to FIG. 3a, a transmit head symbol 301 is shown. The least significant 32 bits of the transmit head symbol 301 must be loaded into the transmit symbol port 215, with the two type field bits 305 loaded into the transmit type port 217, whenever the protocol hardware 205 wants to start a transmission, or when the context of the loaded symbols is switched to another stream. The transmit port evaluates the connection, target, and all hop fields. The controller adds its own source field internally, based on a local node ID value that is set during initialization. Note that the values in bits 31–30 (Access code) and bits 29–28 (Connection code) are used, respectively, for controlling symbol access on the ring and for alternatively providing normal and low-bandwidth transmission on the ring. These settings are not related to the protocol defined here, and therefore will not be explained further. It should be understood, however, that values for the Connection code which are requested by instigators in this protocol must be maintained by partners in the protocol.

Referring now to FIG. 3b, a received head symbol 303 is shown. The least significant 32 bits of the received head symbol 303 are retrieved by the protocol hardware 205 from the receive symbol port 211, and the two type field bits 307, set equal to 0 to indicate that this is a head symbol, are retrieved from the receive type port 213. The received head symbol 303 contains the same fields as are found in a transmit head symbol 301, but the fields occupying bits 27–0 undergo a circular shift from their original positions when they exit the receive symbol port 211. The purpose of this shift is to support routing of streams in multiple-ring topologies.

A multiple-ring topology is depicted in FIG. 4, in which ring 401 is linked to ring 403 by means of bridge 407, and in which ring 403 is further linked to ring 405 by means of bridge 409. In this topology, it is possible for a node A 411 to communicate with node B 413 by appropriately encoding a head symbol as will be explained shortly.

An implementation of a suitable bridge for use in a multiple-ring topology, as well as an addressing scheme for transferring information between non-bridge nodes, called leaf nodes, located in different rings of the multiple-ring topology, are the subject matter of U.S. patent application Ser. No. 08/026,969, entitled ECONOMICAL PAYLOAD STREAM ROUTING IN A MULTIPLE-RING NETWORK, P. Sweazy, filed Mar. 5, 1993, and assigned to the assignee of this invention, the entire disclosure of which is hereby incorporated by reference.

A preferred embodiment of a bridge 501 is shown in FIG. 5. The bridge 501 consists of two ring interface chips 203-a and 203-b which are connected at their respective client ports. Consequently, any symbol received by ring interface 203-a from ring 503 will be presented to ring interface 203-b for further transmission on ring 505, and vice versa.

Encoding of a head symbol to effect communication between node A 411 and node B 413 can now be explained, with reference to FIGS. 6a–6c. As shown in FIG. 6a, the node identification (ID) in ring 401 of bridge 407 is encoded in the target field 601. The node ID in ring 403 of bridge 409 is then encoded in the HOP1 field 603 (bits 19–16). Finally, the node ID in ring 405 of node B 413 is encoded in the HOP2 field 605. The remaining bits 11–0 represent unused HOP fields 607, and need not be initialized to any particular value. After the head symbol 600 is presented to node A 411, the ring interface 203 associated with node A 411 will insert the node ID of Node A 411 into the source field 609.

When the head symbol 600 arrives at bridge 407, the receiving ring interface (not shown) in bridge 407 recognizes its own node ID in the target field 601, circularly shifts bits 27–0, as described above, and presents the modified head symbol to its transmitting ring interface (not shown). The transmitting interface inserts its own node ID into the source field (bits 27–24, and transmits this head symbol 611 in ring 403 (see FIG. 6c).

The head symbol 611 is similarly transformed as it passes through bridge 409 onto ring 405, and then again as it is received at node B 413 and passed to node B's client interface. After being received by node B, the header symbol 613 has the format shown in FIG. 6c.

Description of the Protocol

In accordance with the present invention, each data transfer resulting from any of the defined transactions (e.g. GET, PUT, PROXY) is associated with a Port ID. This is to provide a mechanism for a node to correctly sort out multiple data streams which may be arriving in a multiplexed fashion. Additional Port ID's are also required by some of the defined transactions. These will be further explained below.

Port IDs are preferably defined to be a multiple of four bits. This allows them to occupy unused head symbol HOP fields in certain situations, which are described below.

A detailed description of each of the operations defined in accordance with the present invention will now be presented. For each of the defined operations, a sequence of transmissions will first be presented. This sequence, which defines which node (e.g. instigator, partner) sends what information at what time, will be presented at a level of abstraction which is equally applicable to a number of supporting hardware environments. Next, a more detailed sequence of symbol exchanges will be presented which is applicable to a ring built in accordance with a preferred embodiment of the present invention. In each instance, it should be understood that the operations depicted at the various nodes are under the control of the protocol hardware 205 associated with that node. For example, when it is indicated that a particular symbol is to be transmitted to another node, it is the protocol hardware which constructs the desired symbol and presents it to the ring interface 203 for transmission on the ring. Similarly, when a symbol is received and acted upon, it is the protocol hardware 205 that carries out this operation; the ring interface 203 is unaware of the existence of the protocol, and merely serves as a conduit for communicating symbols on the ring. Of course, the protocol hardware is also responsible for providing a correct interface to whatever type of component it is attached to at its client interface 219.

Referring now to FIG. 7, a flow diagram of a GET operation is shown. Operations performed by the instigator node are shown on the left, and operations performed by the partner node are shown on the right.

The GET begins at block 701, with the instigator node sending a GET command to the partner node. Next, at blocks 703, 705, and 707, the instigator node sends, respectively, a port ID to be associated with returning data, a buffer start address that indicates an address in the partner's local environment, and a buffer length to indicate the amount of data being requested.

At the partner node, the GET command is received and decoded at block 715. Then, at blocks 717, 719, and 721, the partner receives, in succession, the port ID to be associated with the returning data, the buffer start address, and the buffer length. These received values are placed in appropriate locations, such as address registers and counters, for use during the data transmission loop, which consists of blocks 723 and 725. Block 723 is a decision block, in which the partner makes an appropriate test (such as counter equal to zero) to see whether it still needs to transmit data to the instigator. If data still needs to be sent, then this is accomplished in block 725. The step of sending data includes adjusting the buffer address to point to the next data symbol to be transmitted, and adjusting the buffer count to indicate that another data symbol has been sent. In the preferred embodiment, the partner knows which node to transmit the data to because this information is included with the GET command. However, those skilled in the art will recognize that the instigator node could have transmitted his own node ID in a separate transmission to the partner.

When it is determined, at block 723, that there is no more data to send, the partner then executes block 727, in which a notice of completion (NoC) is sent to the instigator.

Back at the instigator node, the data is received at block 709. The instigator node knows which stream this data is associated with, because the data is accompanied by the port ID that was originally transmitted at block 703.

Next, at block 711, the instigator receives the NoC for this port ID, indicating that the partner has completed the GET operation. At block 713, the instigator clears any local resources that were dedicated to this process.

It will be recognized that because the instigator knows how much data to expect, block 709 could consist of a receive data symbol operation followed by a test to see whether all of the expected data has been received. Consequently, the use of the NoC to terminate the GET may seem redundant. However, the presence of the NoC will be useful for another operation, to be defined below.

Referring now to FIG. 8, a preferred implementation of the sequence of symbols associated with the GET command is shown. Symbols transmitted by the instigator of the GET are shown in sequence, from left to right, on the top line. Symbols transmitted by the partner are shown in sequence, from left to right, on the bottom line.

The information that is shown being sent by the instigator at blocks 701 through 707 in FIG. 7 is sent as the packet shown on the top line of FIG. 8. Because all packets must begin with a head symbol, the head symbol 801 is the first thing transmitted to the partner node. If we assume, for the sake of example, that the instigator is node A 411 (see FIG. 4) and the partner is node B 413, then the corresponding head symbol 801 for the GET operation is shown in detail in FIG. 9a. Because node B 413 is several rings away from node A 411, the partner node ID 901 designates two bridge nodes, $B1_{TGT}$ and $B2_{TGT}$, in addition to Node B. These three components of the partner node ID 901 are specified in the same order in which the head symbol will traverse the multi-ring topology, and require that the first two HOP fields be used. Note also, that the Source Node Id 903 is not coded by the protocol hardware 205, but is instead automatically provided by the ring interface 203, as fully described above.

Another important aspect of the head symbol is the presence of all 1's (Fh Fh Fh in hexadecimal notation) in the three unused HOP fields 905 (located in the least significant bits of the head symbol). The first (i.e. most significant 4 bits) of the unused HOP fields 905 represents the messaging port 907 when it is encoded to be Fh. Its importance will become apparent from an examination of FIG. 9b, which illustrates what the head symbol looks like after it has been received at node B 413. Because of the circular shifts that occur as the head symbol passes through the various ring interfaces 203 located in the bridges 407, 409 and at node B 413, the unused HOP fields 905' have been shifted to occupy bits through 23 through 12. Significantly, the messaging port 907' has been shifted so that it occupies bits 23 through 20. This will be the case no matter how many bits the partner node ID 901 occupies, as long as at least one HOP field is left unused. Consequently, in accordance with the present invention, the protocol hardware 205 examines bits 23 through 20 of each head symbol that it receives, to determine whether they are equal to Fh, indicating that it is the messaging port. If the messaging port is received, then the protocol hardware 205 recognizes that the packet being received represents a protocol transaction. Note that a result of this designation is that no other port ID can begin with Fh in the first nibble, because this would appear to be the messaging port ID rather than a data transfer port ID or a response port ID.

Continuing now with the sequence of GET symbols, the next symbol sent by the instigator is a frame symbol 802, encoded to indicate the presence of the GET command. The sending of this symbol corresponds to the activity designated by block 701 in FIG. 7. A preferred encoding scheme for frame symbol 802 is shown in FIG. 10. The protocol operation frame 1000 has a four-bit function field 1001 encoded as follows:

| TRANSACTION | FUNCTION FIELD 1001 |
| --- | --- |
| PUT | 0000 |
| GET | 0001 |
| PROXY | 0010 |
| NoC | 0011 |
| DEGENERATE PUT | 0100 |
| ACKNOWELEDGED NoC | 0101 |
| PAUSE | 0110 |
| RESUME | 0111 |
| END STREAM | 1000 |
| RESET | 1111 |

Thus, for the GET operation, the function field 1001 would be set equal to 0001. The operation type field 1003, which may be encoded to designate up to 256 "families" of protocol transactions, should be set equal to 0000 0000 in order to designate the transaction family defined by the above table. Those skilled in the art will recognize that alternative encoding schemes for the frame symbol 802 are also possible.

Returning now to FIG. 8, data symbol 803 is the next symbol sent by the instigator of the GET operation. This transmission corresponds to the activity specified at block 703 in FIG. 7. The data symbol 803 has the port ID 909, which must be associated with the returning data, encoded in it as shown in FIG. 9c. Port ID 909 is shown as a four-bit quantity. However, ports may be defined to be any multiple of four bits, up to a maximum of 20 bits. The reason for this restriction is that they are conveyed from the instigator node to a partner node in one or more unused HOP fields. Within a head symbol, port ID's are required to be placed left justified in the unused hop fields. Consequently, the port ID 909 has been placed in a position that corresponds to the most significant 4 bits of the unused HOP fields 905. Also, in the preferred embodiment, the two-bit connection code 911, that the instigator wants the partner to use when sending the requested data stream, is placed in this data symbol as shown (alternative embodiments may not require a connection code 911). The remaining bits should be set equal to 1. The reason for the placement of the port ID 909 and connection code 911, and the setting of the remaining bits will become evident during the discussion of the partner side of this transaction.

Referring back to FIG. 8, two data symbols, representing the Buffer Start Address 804 and Buffer Length 805 are transmitted by the instigator node. These transmissions correspond to the actions shown at blocks 705 and 707 in FIG. 7. FIGS. 9d and 9e show the respective encodings of the Buffer Start Address 804 and Buffer Length 805.

In a preferred embodiment, the Buffer Start Address 804 specifies a byte address as would be found in a typical computer bus system (i.e., each address points to an eight bit quantity of data). However, in alternative embodiments, the address fields need not be interpreted in this manner. Instead, they could just as easily refer to smaller or larger entities. This would allow a particular node on a ring to support, for example, bit addressing, nibble addressing, or block addressing. The source of data would send the number of symbols necessary to fulfill the amount of data requested. For example, in bit addressing, if the starting address were 00h and the length were 80h, then the source would send four data symbols. In 512 byte block addressing, with the same starting address and length, the source would send 16,384 data symbols.

In the instance where addressing is designated as byte addressing, a preferred embodiment is to require that for all data transfer operations, data symbols are always aligned on 32-bit (word) boundaries, with respect to the partner's address space. It is not necessary to specify the instigator's local addressing alignment requirements, because the instigator's local address is never communicated over the ring, and thus is not part of the protocol. Also, implementations of the partner of a PUT transaction (see below) can limit themselves to transfers of word granularity. Such partners of a put will simply write all 32-bits of each data symbol that has at least one byte in the address range. That is, the low order two bits of an arriving buffer address are ignored in a PUT transaction, in order to force 32-bit alignment. Note that for a GET transaction, the address and length parameters should preferably have the two least significant bits set to 0.

Also, for nodes that implement byte-oriented addressing, a preferred embodiment requires that the 32-bit data symbols be interpreted as big-endian data. Thus byte 0's data is found in bits 31–24 of the data symbols, byte 1's in bits 23–16, byte 2's in bits 15–8, and byte 3's in bits 7–0. This byte and bit numbering scheme is the same as that used in a number of commercially available microprocessors, such as the Motorola 680×0 family of processors.

In some cases, a node resource may span only a limited address range. For example, a resource may be a status register, that contains only a single unit of data. Because of this, it is the responsibility of the instigator node to ensure that quantities specified in the Buffer Length 805 do not cause the partner node to attempt an access outside of the address range of its resource.

Returning now to the detailed description of the GET operation, after the data symbol corresponding to Buffer Length 805 has been transmitted, the instigator node awaits a response from the partner node.

The partner's response is in the form of a packet which, like all packets, begins with a head symbol. In order to construct head symbol 806, which is the head symbol transmitted by the partner node to the instigator node, the partner node first constructs an intermediate head symbol 806', shown in detail in FIG. 9f. The variable portions of head symbol 806 are the instigator's node ID, and the port ID to be associated with the requested data. In the described embodiment, the head symbol 806 also contains a connection code, specified by the instigator, for use during transmission of the requested data. The connection code is not essential to the protocol of the present invention, but its presence is required by the ring interface 203 used in the particular embodiment being described. The protocol hardware 205 constructs the intermediate head symbol 806' by reversing the order of the least significant six nibbles in the received head symbol 801'. Thus, the least significant 4 bits in received head symbol 801' are placed in bits 23 through 20 in head symbol 806', bits 7 through 4 of received head symbol 801' are placed in bits 19 through 16 in head symbol 806', and so on. However, the order of the bits within each four-bit group is not changed in any manner. By reversing the order of the least significant six nibbles of the received head symbol 801', the protocol hardware is able to construct a head symbol which will be properly routed through the bridges back to the instigator node.

Next, the head symbol 806 is constructed (see FIG. 9g) by extracting the port ID 909 from data symbol 803 and also extracting the connection code 911, and inserting these codes into the intermediate head symbol 806'. The purpose of the above-described placement of the port ID 909 and the connection code 911 within the data symbol 803 (i.e., the placement of the port ID to correspond to a position which would be left justified in the unused HOP fields of a head symbol) is now evident. The head symbol 806 may be simply constructed by logically AND'ing the intermediate head symbol 806' with the data symbol 803. Note that with this technique, the placement of one's in the field 915 of the intermediate head symbol 806' facilitates the easy placement of the connection code 911 into the appropriate field of the head symbol 806.

When the head symbol 806 is received by the instigator node, it has the format shown in FIG. 9h. Note that the port ID 917 arrives left justified in the six target/HOP fields. This placement of the port ID 917 in the received head symbol 806" occurs whenever the partner node initializes the head symbol 806 to have the port ID left justified in the unused HOP fields before transmission. Having the port ID 917 left justified in the six target/HOP fields in the received head symbol 806" allows the instigator node to identify the data stream with minimal parsing.

Referring back now to FIG. 8, the partner sends the requested data symbols 807 through 808. This transmission corresponds to the actions specified by blocks 723 and 725 in FIG. 7. The exact format of these data transmissions 807 through 808 depends on the meaning of the data, which is application specific.

After all of the requested data has been transmitted to the instigator node, the partner node transmits a NoC frame 809. This corresponds to the action specified by block 727 in FIG. 7. In a preferred embodiment of the present invention, the NoC frame 809 would be encoded as shown in FIG. 10, with the operation type field 1003 set equal to 0000 0000, and the function field 1001 set equal to 0011, as specified by the table set forth above.

As described above, there is no mechanism for a partner to refuse the GET transaction. In a multiprocessor environment, this prevents a node from being able to protect parts of its local address space. Consequently, in an alternative embodiment, a mechanism is defined whereby the instigator of a GET can be denied access to the requested data currently residing at the partner's node. In accordance with this aspect of the invention, a partner would not send requested data to a GET instigator, but would, instead, send a NoC frame, followed by a data symbol containing an error code. Various error codes could be defined. One such error code is, for example, "protected memory area." Of course, there may be other reasons for access refusal that could be encoded.

Referring now to FIG. 11, a flow diagram of a PUT operation is shown. Operations performed by the instigator node are shown on the left, and operations performed by the partner node are shown on the right. One distinction between the PUT operation and the GET operation is the fact that there are two port ID's utilized in the PUT operation. The first, referred to as the response port ID, is sent by the instigator to the partner in order to provide a channel for the response. The second, referred to as the data port ID, is allocated by the partner node, communicated to the instigator, and then used by the instigator as an identifier of the data stream which is subsequently sent to the partner.

The PUT begins at block 1101, with the instigator node sending a PUT command to the partner node. Implicit in this PUT command is a request for the partner node to return a data port ID to be associated with the transmission of data. Next, at blocks 1103, 1105, and 1107, the instigator node sends, respectively, a response port ID to be associated with the returning response, a buffer start address that indicates an address in the partner's local environment where the data should be stored, and a buffer length to indicate the amount of data being transmitted.

At the partner node, the PUT command is received and decoded at block 1115. Then, at blocks 1117, 1119, and 1121, the partner receives, in succession, the response port ID to be associated with the response that the partner sends back to the instigating node, the buffer start address, and the buffer length. These received values are placed in appropriate locations, such as address registers and counters, for later use during the data receive operation at block 1125.

At block 1123, the partner node allocates a data port ID to be associated with the transmitted data stream, and sends the data port ID to the instigator node.

The instigator node receives the data port ID at block 1109, and then uses the data port ID when, at block 1111, it sends the data to the partner node. After all of the data has been transmitted to the partner, the instigator node sends a NoC to the partner (block 1113).

On the partner side of the transaction, the partner node receives all of the transmitted data (block 1125), and stores it at the buffer address received at block 1119. Then, at block 1127, the partner node receives the NoC. The operation continues at block 1129, where the partner node clears the local resources used for this transaction.

It will be recognized that because the partner node knows how much data to expect, block 1125 could consist of a receive data symbol operation followed by a test to see whether all of the expected data has been received. Consequently, the use of the NoC to terminate the PUT may seem redundant. However, the presence of the NoC will be useful for another operation, to be defined below.

Referring now to FIG. 12, a preferred implementation of the sequence of symbols associated with the PUT command is shown. Symbols transmitted by the instigator of the PUT are shown in sequence, from left to right, on the top line. Symbols transmitted by the partner are shown in sequence, from left to right, on the bottom line.

The information that is shown being sent by the instigator at blocks 1101 through 1107 in FIG. 11 is sent as the first packet shown on the top line of FIG. 12 (symbols 1201 through 1205). Because all packets must begin with a head symbol, the head symbol 1201 is the first thing transmitted to the partner node. If we again assume, for the sake of example, that the instigator is node A 411 (see FIG. 4) and the partner is node B 413, then the corresponding head symbol 1201 for the PUT operation is shown in detail in FIG. 13a. The format of this head symbol 1201 is identical to that described above with respect to the head symbol 801 that starts of the GET operation. Consequently, that explanation should be consulted for details concerning the fields shown FIG. 13a.

FIG. 9b illustrates what the head symbol looks like after it has been received at node B 413. Note that the messaging port 1307' has been shifted so that it occupies bits 23 through 20. When the protocol hardware 205 recognizes Fh in this field, it will know that the packet being received represents a protocol transaction.

Continuing now with the sequence of PUT symbols, the next symbol sent by the instigator is a frame symbol 1202, encoded to indicate the presence of the PUT command. The sending of this symbol corresponds to the activity designated by block 1101 in FIG. 11. A preferred encoding scheme for frame symbol 1202 is shown in FIG. 10. Thus, for the PUT operation, the function field 1001 would be set equal to 0000, and the operation type field 1003 should be set equal to 0000 0000.

Returning now to FIG. 12, data symbol 1203 is the next symbol sent by the instigator of the PUT operation. This transmission corresponds to the activity specified at block 1103 in FIG. 11. The data symbol 1203 has the response port ID 1309 encoded in it as shown in FIG. 13c. The response port ID 1309 is to be used by the partner node when it responds to this PUT request. The response port ID 1309 is shown as a four-bit quantity, but may be defined to be any multiple of four bits, up to a maximum of 20 bits. Also, in the preferred embodiment, the two-bit connection code 1311, that the instigator wants the partner to use when sending the response, is placed in this data symbol as shown (alternative embodiments may not require the connection code 1311). The remaining bits should be set equal to 1.

Referring back to FIG. 12, two data symbols, representing the Buffer Start Address 1204 and Buffer Length 1205 are transmitted by the instigator node. These transmissions correspond to the actions shown at blocks 1105 and 1107 in FIG. 11. FIGS. 13d and 13e show the respective encodings of the Buffer Start Address 1204 and Buffer Length 1205.

With regard to the respective formats of the Buffer Start Address 1204 and Buffer Length 1205, the remarks made above concerning the use of these data symbols in the GET operation are also applicable here. That is, the address quantities may represent whatever units of data are supported by a particular partner node. In a preferred embodiment, byte addressing is used, with 32-bit (word) alignment with respect to the partner's address space being a requirement. As to specifications of buffer length, an instigator must be careful not to specify a POT of more data units than the partner node can accommodate. For example, a PUT of ten words to an address that represents a one word control register would produce unpredictable results.

Returning now to the detailed description of the PUT operation, after the data symbol corresponding to Buffer Length 1205 has been transmitted, the instigator node awaits a response from the partner node.

The partner's response is in the form of a packet which, like all packets, begins with a head symbol. In order to construct head symbol 1206, which is the head symbol transmitted by the partner node to the instigator node, the partner node first constructs an intermediate head symbol 1206', shown in detail in FIG. 13f. The variable portions of head symbol 1206 are the instigator's node ID, and the response port ID. In described embodiment, the head symbol 1206 also contains a connection code, specified by the instigator, for use during transmission of the response. As with the GET operation, the protocol hardware 205 constructs the intermediate head symbol 1206' for the PUT operation by reversing the order of the least significant six nibbles in the received head symbol 1201'. By reversing the order of the least significant six nibbles of the received head symbol 1201', the protocol hardware is able to construct a head symbol which will be properly routed through the bridges back to the instigator node.

Next, the head symbol 1206 is constructed (see FIG. 13g) by extracting the response port ID 1309 and the connection code 1311 from data symbol 1203, and inserting these codes into the intermediate head symbol 1206'. The above-described placement of the response port ID 1309 and the connection code 1311 within the data symbol 1203 (i.e., the placement of the response port ID to correspond to a position which would be left justified in the unused HOP fields of a head symbol) permits construction of the head symbol 1206 simply by logically AND'ing the intermediate head symbol 1206' with the data symbol 1203. Of course, alternative embodiments may use other techniques, such as hard wiring various data fields to certain bit positions, to produce the same results. What is important is that the head symbol 1206 have the format exemplified by FIG. 13g.

When the head symbol 1206 is received by the instigator node, it has the format shown in FIG. 13h. Note that the response port ID 1317 arrives left justified in the six target/HOP fields. This placement of the response port ID 1317 in the received head symbol 1206" occurs whenever the partner node initialize the head symbol 1206 to have the response port ID left justified in the unused HOP fields before transmission. Having the port ID 1317 left justified in the six target/HOP fields in the received head symbol 1206" allows the instigator node to identify the data stream with minimal parsing.

Referring back now to FIG. 12, the partner sends a data symbol 1207 which contains a data port ID which it has allocated for the data stream that the instigator will be sending. This transmission corresponds to the action specified in block 1123 of FIG. 11. The data port ID 1319 is left justified in the data symbol 1207, as shown in FIG. 13i. In this example, the data port ID 1319 is shown being 8 bits long, so there is a high nibble (Port$_{DHN}$) and a low nibble (Port$_{DLN}$).

The instigator node must know ahead of time what the size of the data port ID 1319 will be, so that it can avoid addressing partner nodes which are so far away that the number of unused HOP fields is insufficient to accommodate the data port ID 1319. In the embodiment being described, the instigator has no control over the size of the data port ID 1319. However, in an alternative embodiment, a mechanism is provided whereby the instigator can cause a partner to return a data port ID of a specific maximum number of nibbles, in order to ensure enough space in the header to address the partner node. In this alternative embodiment, the instigator supplies the maximum acceptable number of nibbles for the data port of the put by placing the number in bits 24–27 of the data symbol containing the response port that it sends to the partner during transaction setup. The number may range from 1 to 4. The value Fh in those bits is the indicator that this option is not being used and the partner may allocate any length port within its declared maximum.

After the instigator receives the data symbol containing the data port ID 1319, it constructs head symbol 1208 in accordance with the principals outlined above with respect to other head symbols. The head symbol 1208 is shown in detail in FIG. 13j. Note that the data port ID 1319' has been left justified in the unused HOP fields (the remaining HOP fields were necessary to contain the node ID of the partner node).

The instigator node then sends a packet to the partner node, the packet comprising the head symbol 1208 followed by data packets 1209 through 1210 (to be stored at the previously specified Buffer Address at the partner node), and a NoC frame 1211. In a preferred embodiment of the present invention, the NoC frame 1211 would be encoded as shown in FIG. 10, with the operation type field 1003 set equal to 0000 0000, and the function field 1001 set equal to 0011, as specified by the table set forth above. The sending of symbols 1208 through 1211 corresponds to the actions specified by blocks 1111 and 1113 in FIG. 11. Note that when the head symbol 1208 is received at the partner node, it has the format shown in FIG. 13k. In accordance with the present invention, the data port ID 1319" occupies the most significant bits out of bits 23–0 (in this case, bits 23 through 16, because the data port ID 1319" is 8 bits wide). This simplifies the work of the protocol hardware 205 at the receiving node, because it can always look for a port ID in the same location of any head symbol it receives.

As described above, there is no mechanism for a partner to refuse the PUT transaction. In a multiprocessor environment, this prevents a node from being able to protect parts of its local address space. Consequently, in an alternative embodiment, a mechanism is defined whereby the instigator of a PUT can be denied access to the partner node's data area. In accordance with this aspect of the invention, when the partner returns the port for the data to the instigator, it is left justified. Because the messaging port of all 1's is reserved, if the bits 28–31 are all 1's, then this constitutes refusal of the transaction. An additional data symbol, containing an error message, is then sent after the data symbol that contains the refusal. Various error messages could be defined. One such error message is, for example, "protected memory area." Of course, there may be other reasons for access refusal that could be encoded, such as "out of resources; try again later" or "that area is currently locked; try again later."

Referring now to FIG. 14, a flow diagram of a PROXY operation is shown. Operations performed by the instigator node are shown on the left, operations performed by the source partner node are shown in the center column, and operations performed by the target partner node are shown on the right. As an overview of the design, the instigator node communicates with the target partner exactly as it would for a PUT command, but stops just before sending data. Instead, when it reaches that point, it sends a PROXY command to the source partner, followed by all of the information the source partner needs to continue the PUT to the target proxy. The source partner then sends the requested data to the target partner. However, when the source partner has finished sending the data to the target partner, it sends the NoC to the instigator node, rather than to the target partner. In response to receiving the NoC from the source partner, the instigator node sends a NoC to the target partner. The details of the process just outlined will now be presented.

The PROXY begins at block 1401, with the instigator node sending a PUT command to the target partner node. Implicit in this PUT command is a request for the target partner node to return a data port ID to be associated with the transmission of data. Next, at blocks 1403, 1405, and 1407, the instigator node sends, respectively, a first response port ID ("Resp1 port ID") to be associated with the returning response, a target buffer start address that indicates an address in the target partner's local environment where the data should be stored, and a target buffer length to indicate the amount of data being transmitted.

At the target partner node, the PUT command is received and decoded at block 1439. Then, at blocks 1441, 1443, and 1445, the target partner receives, in succession, the Resp1 port ID to be associated with the response that the target partner sends back to the instigating node, the target buffer start address, and the target buffer length.

At block 1447 the target partner node allocates a data port ID to be associated with the transmitted data stream, and sends the data port ID to the instigator node.

The instigator node receives the data port ID at block 1409. Then, at block 1411, the instigator node sends a PROXY command to the source partner. At block 1413, the instigator node builds a head symbol for use by the source partner in communicating with the target partner. In accordance with the present invention, the head symbol contains the necessary target partner's node ID. Furthermore, the head symbol contains the data port ID in the most significant unused HOP fields of this head symbol. Then, this head symbol is sent as a data symbol to the source partner. This is followed, at block 1415, by sending a second response port ID (Resp2 port ID) to the source partner. At blocks 1417 and 1419, the instigator sends, in succession, the source buffer start address and the source buffer length. These will be used by the source partner node to locate the data that is to be transmitted to the target partner.

Looking at the source partner side of the transaction, the source partner, at blocks 1425, 1427, 1429, 1431 and 1433, receives the PROXY command, the data representing a head symbol, the Resp2 port ID, the source buffer start address, and the source buffer length. Then, at block 1435, the source partner uses this information to send the data, specified by the source buffer start address and source buffer length, to the target partner. Routing to the target partner is accomplished by means of the head symbol received at block 1427. The target partner, executing block 1449, receives all of the data sent by the source partner, and awaits the receipt of a NoC.

After the source partner has sent all of the data to the target partner, the source partner executes block 1437, where it sends a NoC back to the instigator node. The instigator node receives this NoC at block 1421, and responds by executing block 1423, where it sends a NoC to the target partner to complete its "PUT" operation. The target partner receives this NoC when it executes block 1451.

Referring now to FIG. 15, a preferred implementation of the sequence of symbols associated with the PROXY command is shown. Symbols transmitted by the instigator of the PROXY are shown in sequence, from left to right, on the top line. Symbols transmitted by the target partner are shown in sequence, from left to right, on the middle line, and symbols transmitted by the source partner are shown in sequence from left to right, on the bottom line. In this example, each symbol is shown schematically. It should be understood that the actual encoding of any of the symbols is to be done in accordance with the principles fully described above with respect to the PUT and GET transactions.

The information that is shown being sent by the instigator at blocks 1401 through 1407 in FIG. 14 is sent as the first packet shown on the top line of FIG. 15 (symbols 1501 through 1505). Because all packets must begin with a head symbol, the head symbol 1501 is the first thing transmitted to the source partner node. The messaging port ID is used to alert the source partner to the fact that a protocol transaction is being requested.

Next, the instigator sends a frame symbol 1502, encoded to indicate the presence of a PUT command. The sending of this symbol corresponds to the activity designated by block 1401 in FIG. 14. It must be recalled that, from the point of view of the target partner, there is no difference between a PUT and a PROXY transaction. Consequently, the PROXY transaction is more efficiently implemented by making use of the target partner's provisions for acting as the partner of a PUT. However, it will be readily apparent to those skilled in the art that the target partner could also be implemented so as to perform the same actions in response to receiving an appropriately encoded PROXY command.

Returning now to FIG. 15, data symbol 1503 is the next symbol sent by the instigator of the PROXY operation. This transmission corresponds to the activity specified at block 1403 in FIG. 14. The data symbol 1503 has the Resp1 port ID (not shown) encoded in it in accordance with the principles illustrated by FIG. 13c. The Resp1 port ID is to be used by the target partner node when it responds to this PUT (really PROXY) request. As is true for all port ID's defined in accordance with the present protocol, the Resp1 port ID may preferably be defined to be any multiple of four bits, up to a maximum of 20 bits. Also, in the preferred embodiment, the two-bit connection code (not shown), that the instigator wants the target partner to use when sending the response, is placed in this data symbol 1503. The remaining bits of the data symbol 1503 should be set equal to 1.

Next, two data symbols, representing the Target Buffer Start Address 1504 and Target Buffer Length 1505 are transmitted by the instigator node. These transmissions correspond to the actions shown at blocks 1405 and 1407 in FIG. 14.

After the data symbol corresponding to Target Buffer Length 1505 has been transmitted, the instigator node awaits a response from the target partner node.

The target partner's response is in the form of a packet which, like all packets, begins with a head symbol. The head symbol 1506, which is constructed in accordance with principles set forth above, contains the instigator's node ID and the Resp1 port ID which was previously received from the instigator node. In the described embodiment, the head symbol 1506 also contains a connection code, specified by the instigator, for use during transmission of the response.

The target partner follows the transmission of the head symbol 1506 with the transmission of a data symbol 1507. The data symbol 1507 contains a data port ID which the target partner has allocated for the data stream and terminating NoC that it expects to receive. This transmission corresponds to the action specified in block 1447 of FIG. 14. The data port ID (not shown) is left justified in the data symbol 1507.

After the instigator receives the data symbol 1507 containing the data port ID, it prepares to send a packet to the source partner by constructing a head symbol 1508 in accordance with the principals outlined above with respect to other head symbols. The head symbol 1508 is addressed to the source partner node, and contains the messaging port ID, so that the source partner node will recognize that a protocol transaction is being requested.

Next, the instigator node sends a frame symbol 1509, encoded to indicate the presence of a PROXY command. The sending of this symbol corresponds to the activity designated by block 1411 in FIG. 14.

Following this, the instigator node creates and subsequently transmits a data symbol 1510 having the format of a head symbol (not shown) which is to be used by the source partner when it begins to transmit data to the target partner. That is, the "head symbol" (really data symbol 1510) contains appropriate addressing information for traversing the ring from the source partner node to the target partner node. Note that this requires that the instigator of a PROXY have full knowledge of the topology of the ring, since it must know not only the HOP field paths to the source and to the target, but also the HOP field path required by the source to reach the target.

Additionally, the "head symbol" contains the data port ID that was received from the target partner. As with the placement of all port ID's in head symbols constructed in accordance with the present invention, the data port ID is left justified in the positions occupied by unused HOP fields. It should be noted that because the "head symbol" is transmitted to the target partner in the form of a data symbol 1510, it arrives unchanged at the target partner node. That is, there is no circular shifting of bits, and no substitution of bridge source node ID's for bridge target node ID's. Consequently, the data symbol 1510 is "ready to use" as a head symbol when it is received by the target partner.

Returning now to the detailed description of the PROXY operation, data symbol 1511 is the next symbol sent by the instigator to the source partner. This transmission corresponds to the activity specified at block 1415 in FIG. 14. The data symbol 1503 has the Resp2 port ID (not shown) encoded in it in accordance with the principles illustrated by FIG. 13c. The Resp2 port ID is to be used by the source partner node when it responds to this PROXY request. As is true for all port ID's defined in accordance with the present protocol, the Resp2 port ID may preferably be defined to be any multiple of four bits, up to a maximum of 20 bits. Also, in the preferred embodiment, the two-bit connection code (not shown), that the instigator wants the source partner to use when sending the response, is placed in this data symbol 1511. The remaining bits of the data symbol 1511 should be set equal to 1.

Next, two data symbols, representing the Source Buffer Start Address 1512 and Source Buffer Length 1513 are transmitted to the source partner by the instigator node. These transmissions correspond to the actions shown at blocks 1417 and 1419 in FIG. 14.

After the data symbol corresponding to Source Buffer Length 1513 has been transmitted, the instigator node awaits a response from the source partner node.

The source partner node, in response to receipt of the Source Buffer Length 1513, sends a packet to the target partner node, the packet comprising the head symbol 1514 followed by data packets 1514 through 1515 (to be stored at the previously specified Target Buffer Address at the target partner node). This corresponds to the actions specified by block 1435 in FIG. 14. Note that the head symbol 1514 is actually the received data symbol 1510 which is now transmitted on the ring with symbol type set equal to "Head Symbol." Thus, this transmission will be routed to the target partner, with the appropriate data port ID specified.

After sending the last data symbol 1516 to the target partner, the source partner constructs another packet, comprising head symbol 1517 and frame symbol 1518. The head symbol 1517 is addressed to the instigator node, and the Resp2 port ID is left justified in the positions occupied by unused HOP fields in the head symbol 1517. The frame symbol 1518 is encoded as a NoC frame. In a preferred embodiment of the present invention, the NoC frame would be encoded as shown in FIG. 10, with the operation type field 1003 set equal to 0000 0000, and the function field 1001 set equal to 0011, as specified by the table set forth above. The sending of the packet comprising symbols 1517 and 1518 corresponds to the action specified by block 1437 in FIG. 14.

After receiving the NoC from the source partner node, the instigator sends the packet comprising head symbol 1519 and frame symbol 1520. The head symbol 1519 is addressed to the target partner node, and contains the data port ID originally received from the target partner node at block 1409 (FIG. 14). The frame symbol 1520 is encoded as a NoC. The sending of this packet, consisting of symbols 1519 and 1520, corresponds to the action specified in block 1423 in FIG. 14. The PROXY operation is thus concluded.

In the description of the PROXY transaction above, the instigator conveys to the source the addressing information in the source's address space. However, two more bits must be sent when the source supports mis-aligned addressing. These bits are the offset between the source node's word boundary and the target node's word boundary. The source can then do the byte shifting and the mixing of cycles to place its data in the byte positions expected at the target before placing the data onto the ring.

For example, if the data byte at the source at address 0 (mod 4) is destined for the target at address 3 (mod 4), then these two bits will be 1,1. Since, in a preferred embodiment, the data alignment over the ring is on word boundaries with respect to the target, the source would need to read a word at 0 (mod 8) and a word at 4 (mod 8), concatenate them, and send bytes 1, 2, 3, 4 in bytes 0, 1, 2, 3 respectively of the transmitted data symbol.

An embodiment of the inventive protocol has been described, in which data transfer operations are effected by means of the GET, PUT, and PROXY protocol commands. Alternative embodiments may include, in addition to the three protocol commands described above, one or more additional features for controlling the flow of data. These additional features will now be described.

As defined above, GET, PUT, and PROXY commands support the transfer of blocks of data of predetermined size. In some situations, however, what is desired is to initiate a flow of data of indefinite length, referred to as an ongoing stream. Two examples of such ongoing streams are: 1) opening up a real-time flow to an area of a screen for placing a live video window, and 2) placing a stream of data continuously into the single address that is the data port for a sound chip. This requirement can be satisfied by means of a wrap around mode for target buffer addresses during a put. In wrap around mode, if the data stream for a put continues beyond the number of symbols required to reach the buffer length, then the new data symbols are interpreted as beginning over again at the starting buffer address.

In contrast to the PUT operation described above in conjunction with transfers of blocks of data of known size, the use of wrap around mode creates a requirement for a NoC message, because the target has no other way of determining when a transaction has completed.

There are also ongoing streams that can originate in the source node. For example, an audio digitizer board would have a stream of indefinite length. In order to extend the wrap around concept to sources of data, two new mechanisms may be defined: one to initiate data flow, and another to halt it. As to initiating a flow of indefinite length data, this may be accomplished in accordance with the present invention by defining a data start operation which is triggered by a GET to a predefined address. Of course, the instigator in this instance must know what that address is. In a preferred embodiment, this is accomplished by storing the address in a ROM, located at the partner node, which may be read by the instigator during system startup.

With respect to terminating the flow of data, this may be accomplished, in accordance with the present invention, by means of an End Stream frame symbol that is sent by the instigator of the GET (or PROXY). The End Stream frame symbol is defined as shown in FIG. 10. The function field 1001 is set equal to 1000, and the operation field 1003 should be set to 0000 0000. Of course, other encoding schemes are possible.

Upon the receipt of an End Stream frame symbol, the partner stops sending data, and sends a NoC to the instigator. In the case of a GET operation, this End of Stream frame symbol must be sent on the messaging port with the data symbol following the frame symbol containing the data port ID. For a PROXY operation, this End of Stream frame symbol must be sent on the messaging port with the data symbol following the frame symbol containing the Resp2 port ID.

FIG. 16 illustrates the above-described protocol when an instigator node performs a GET to a streaming data source. Symbols transmitted by the instigator of the GET are shown in sequence, from left to right, on the top line. Symbols transmitted by the partner are shown in sequence, from left to right, on the bottom line. The first packet 1601 that is sent by the instigator node has the same format as for any GET operation. The partner responds by sending the head symbol 1603 which is also formatted the same as for any other GET operation. Then, the partner sends the ongoing stream of data symbols 1604.

In order to stop the partner from continuing to send data symbols, the instigator formats and sends a packet comprising head symbol 1605, End Stream frame symbol 1606 and data symbol 1607 containing the data port ID 1667 that the partner had allocated for this transmission. The head symbol 1605 identifies the messaging port ID (=Fh) so that the partner node recognizes the receipt of a protocol transaction request. Next, the End Stream frame symbol 1606 is sent, encoded as explained above. Finally, the data symbol 1607 contains the data port ID 1607 so that the partner node will know which transmission to stop.

After the partner node has parsed the received packet, it stops sending data, and completes the operation by sending a NoC frame 1608 to the instigator node.

Another feature which may be incorporated into the protocol relates to the fact that problems can arise during the course of system operation. For example, target nodes can run out of ports if NoC frames are missed. Also, either node can cease participating in transactions if a transaction setup sequence fails to complete. In order to correct any of these situations, a reset is defined by the present protocol. The reset re-initializes a stream or a transaction setup between two nodes on the ring.

A reset sequence is illustrated in FIG. 17. Instigator transmissions are illustrated on the top line, in sequence from left to right. Partner transmissions are shown on the bottom line, in sequence from left to right. Upon determining that a reset is necessary, the instigator sends a head symbol 1701, containing the messaging port ID (=Fh) to the partner. Next, a reset frame symbol 1702 is transmitted. Finally, the instigator sends data symbol 1703, whose encoding modifies the operation of the reset. If the data symbol 1703 is all 1's, then the partner is to clear any pending transaction setups with the other node and respond with a NoC frame sent on the messaging port. This is illustrated by the head symbol 1704 (interpreted without the optional port ID shown in parentheses) followed by NoC frame 1705. Alternatively, if the data symbol 1703 is not all 1's, then the partner node is to interpret the data symbol 1703 as a port ID that was previously generated by the node that generated the reset frame 1702. In this case, the partner node must clear the transmission buffers for that port ID to that node, and return a NoC with the port properly placed in the head symbol. This is illustrated by the head symbol 1704 incorporating the port ID, followed by the NoC frame 1705.

This means that only targets can generate a reset once the data transfer stage of the transaction has begun. The position of the port in the data symbol 1703 is the same as it was during transaction setup, that is, pre-shifted for GET's, and left justified for PUT's.

In the case of a PROXY operation, the target partner sends a reset to the instigator because that is the node with which it was communicating during the transaction setup. The reset frame is accompanied by the data port in the next data symbol. In order to complete the reset, the instigator of the proxy is required to then send a reset to the source partner, with the data symbol after the reset frame symbol containing the port ID which the source partner would have used to send the NoC frame to the instigator.

The above-described error recovery mechanism is designed to disrupt operation of the ring as little as possible. Thus, the reset mechanism only affects the specified transactions between the particular pair of nodes without interfering with any other transactions on the ring.

Another feature which may be incorporated into the protocol relates to flow control. Two protocol sequences have been defined to respectively pause and resume transmission.

FIG. 18 illustrates the pause operation. A target that wants to pause the flow of incoming data sends a head symbol 1801 to the source node. This is followed by a pause frame 1802, preferably formatted as shown in FIG. 10. The function field 1001 is set equal to 0110, and the operation field 1003 should be set to 0000 0000. Of course, other encoding schemes are possible. Following the pause frame 1802 is a data symbol 1803 which contains the port ID that was used in the transaction. The port ID is preferably positioned within the data symbol identically to the position it was in during stream setup, that is, pre-shifted for GETs, and left justified for PUTs.

FIG. 19 illustrates the resume operation. A target that wants to resume a paused flow of incoming data sends a head symbol 1901 to the source node. This is followed by a resume frame 1902, preferably formatted as shown in FIG. 10. The function field 1001 is set equal to 0111, and the operation field 1003 should be set to 0000 0000. Of course, other encoding schemes are possible. Following the resume frame 1902 is a data symbol 1903 which contains the port ID that was used in the transaction. The port ID is preferably positioned within the data symbol identically to the position it was in during stream setup, that is, pre-shifted for GETs, and left justified for PUTs.

In a preferred embodiment of the invention, if a source node receives a pause and is waiting a very long time for a resume, the source sends a reset to the target after expiration of a timer.

In a proxy operation, the pause or resume is sent by the target partner to the instigator. The instigator then forwards the pause or resume to the source partner with the port data replaced by the port ID that was allocated by the instigator for the eventual NoC message from the source partner. The source partner must stop or start his data stream to the target partner as requested.

In yet another feature which may be incorporated into the protocol, an "acknowledge notice of completion" (AckNoC) frame is defined in order to provide for an explicit acknowledgment of completion, instead of the NoC frame which has been described so far. When a source node sends an AckNoC it sends a data symbol immediately following the AckNoC that contains a port ID for the return of the acknowledgment. The port ID is pre-shifted to line up with the first unused HOP field and has a connection field for the response also correctly placed (see, FIG. 9c for an example of the format).

After receiving the packet containing the AckNoC, the target node returns an acknowledge message, as shown in FIG. 20, to the source node using a head symbol 2001 constructed with the port received in the data symbol. The acknowledge message comprises a first data symbol 2002 which contains a count of additional symbols in the acknowledge message. The count is preferably between 1 and 1024. This is followed by a data symbol 2003 representing a completion code. In a preferred embodiment, the completion codes are interpreted as signed 32-bit integers. A code of 0 means successful completion with no status to report. Positive integers represent successful completion with a status to report. Negative integers represent error states which may or may not report a status text message.

The remaining symbols in the acknowledge message are the data symbols 2004 through 2006, which contain a text message. The text message is preferably in a human readable format. Note that there is no NoC after the acknowledgment stream.

An additional feature that can be incorporated into the protocol is called a "degenerate PUT" operation. The need for this operation arises from the fact that in some ring implementations, a node is permitted to perform only a single active transaction with any other node. Also, some ring implementations use small packet sizes in which the overhead of a two stage handshake, which is present in the PUT operation defined above, causes enough latency to undermine throughput of the system. For these instances, the degenerate PUT, in which no port ID is allocated by the target, is useful.

The symbol sequence of a degenerate PUT operation is shown in FIG. 21. The instigator node sends a head symbol 2101 on the messaging port, a degenerate PUT frame 2102, a first data symbol 2103 containing a starting buffer address, and a second data symbol 2104 representing a buffer length. Then the instigator sends all of the data in data symbols 2105 through 2106, followed by a NoC frame 2107.

The target node uses the node ID of the source contained in the head symbol 2101 to differentiate data that may be multiplexed on the ring from multiple sources. As a result, the instigator of a degenerate PUT may not initiate another transaction with the target node until the degenerate PUT is completed. In a preferred embodiment, a node may support being the partner of PUT's, degenerate PUT's, both, or neither.

Note that in contrast to the case where a node can control the number of streams it will receive as a target by controlling the number of data port ID's it allocates, a ring node that supports degenerate PUT's as a target must support simultaneous streams from as many nodes as there are in the ring topology. Therefore, this mode is preferably used only in single (as opposed to multi-) ring topologies.

Note also that a node which supports degenerate PUT's cannot refuse service during transaction setup.

A number of different protocol transactions have been defined, not all of which need be supported by each node in a ring topology. Consequently, there are two problems which must be resolved by any node that intends to be an instigator of any of the protocol transactions. First, the instigator node must know the capabilities of any node it seeks communications with, including which protocol transactions the partner will support. Second, an instigator node must know the topology of the ring (i.e., node ID and location of each node on the ring) so that it can form the necessary address for communicating with another node.

In accordance with the present invention, the first problem is addressed by requiring that each node, except for bridge nodes, contain a read only memory (ROM) which contains all of the necessary information about which capabilities that node supports. Except where the present disclosure indicates otherwise, this ROM is preferably programmed in accordance with standards established and used by Apple Computer, Inc. for the "declaration ROM" (also called "configuration ROM") which is normally found on its cards that communicate with a Macintosh computer through the NuBus protocol. These standards are defined, for example, in the book entitled DESIGNING CARDS AND DRIVERS FOR THE MACINTOSH FAMILY, Third Edition published by Addison-Wesley Publishing Company in 1992, the entire disclosure of which is hereby incorporated by reference.

Having defined the above protocol transactions, the present invention makes use of them to read the declaration ROMs of nodes on the ring. Although a single ring with only internal nodes could, in principle, obtain all the information from a primary busing arrangement between components, such as a NuBus, this approach ceases to function as soon as an external node is added.

Consequently, each node should support GET transactions to read its declaration ROM. Because simple bridge nodes are designed to function without any logic other than two ring interface chips 203 connected back to back on the client ports, they do not have declaration ROMs, and therefore do not support the discovery of capabilities. As will be seen below, bridges should have a small amount of hardware to allow them to absorb requests to read their nonexistent declaration ROM rather than forward the requests on to the next ring.

A node that is never an instigator in a normal data transaction need not have information from the declaration ROMs of other nodes. Therefore, it need not support being an instigator at all.

In a preferred embodiment, the master node of any ring must have a functioning declaration ROM and be able to report the maximum node ID of its local ring. Consequently, a ring consisting entirely of simple bridges, none of which have a declaration ROM, is not permitted. If a master node is a bridge node, it must also support a declaration ROM.

Also in a preferred embodiment, the maximum number of nodes on any local ring in a multi-ring topology is fifteen, instead of the sixteen permitted by the hardware. This is to allow a bridge node to discriminate between a packet addressed to itself and a packet addressed to a node of a far side ring.

In the preferred embodiment, the declaration ROM may be accessed at the top of the node's address space. For example, in the case of a 64 kbit declaration ROM that is one byte wide (i.e., 8×8k), the declaration ROM would be visible at addresses FFFF:8000h to FFFF:FFFCh. The declaration ROM can be aliased in many copies; not all of the address bits need to be decoded.

In order to support bit serial ROMs for use as the declaration ROM, an additional byte lane value has been added to those described in the Macintosh NuBus declaration ROM specifications. This additional byte lane value will be further described below.

Because bit serial ROMs are not random access devices, when an instigator finds that the first data symbol indicates a serial declaration ROM, it then assembles the ROM data from consecutive addresses; it cannot follow the pointers found in the ROM as it otherwise could for a byte wide device. What this means is that the partner node detects an address of FFFF:FFFCh and starts the ROM reading from the first address. GETs from FFFF:FFF8h or below just get the next bit out of the ROM. Since reading starts at the highest address, the serial ROM is in a sense written with its data in reverse order.

In the preferred embodiment, the bit order within a byte coming out of the serial ROM is most significant bit (MSB) first. It will be recognized, however, that with the reversal, this is really the least significant bit (LSB) first from the point of view of the declaration ROM programmer.

In the preferred embodiment, bit serial ROMs send their data on bit 0 of the symbol. Also, the first eight bits of the ROM are preferably defined to be 1,1,1,0,1,0,0,1. This encoding is used because E9h is an unlikely value to find at random and is an illegal value for the byte lane field in standard Macintosh NuBus declaration ROMs (and thus avoids confusion).

Once the adjustment is made for the byte lanes information, the data out of the serial ROM is in the identical format to a Macintosh NuBus declaration ROM. This allows implementations where the Macintosh NuBus declaration ROM is made directly visible over the ring, without the parsing algorithm needing to be different for different styles of ring declaration ROM.

In accordance with the present invention, instigators of the GETs which are used to read the declaration ROM of another node should access only one word per transaction. (That is, the buffer length should always be four.) This restriction prevents a node from needing to contain a direct memory access (DMA) engine that can access the ROM in the device. It is the responsibility of the instigator not to initiate a GET from multiple addresses in the declaration ROM.

In order to allow discovery of multi-ring topologies, all nodes other than simple bridges should preferably make the maximum node number of their local ring available over the ring by means of a GET operation. The address to use to obtain this value should be indicated in the declaration ROM.

Also for the purpose of discovery of multi-ring topologies, in the preferred embodiment, all declaration ROMs, in addition to the device ID analogous to the board ID of a Macintosh NuBus declaration ROM, have a 32-bit unique identifier. The identifier is unique only within that device ID. The device ID and the unique ID taken together are guaranteed to be unique.

Design issues relating to simple bridges will now be described. Multi-ring discovery is complicated because it is not possible to determine which node of a ring is a bridge at startup and because even with the knowledge of which nodes are bridges, it is not possible to determine whether the ring at the far side of the bridge is functioning. Addressing a bridge node attempting to read its (non-existent) declaration ROM would cause the bridge node to forward the initial head symbol on to the next ring with a target field of Fh (which is the messaging port ID). At that point, since there typically are not sixteen nodes in the ring, every node in the next ring would flag an /ABORT condition. Also, the node of the bridge in the next ring has at least one symbol stuck in its transmit FIFO that cannot be flushed except by a /RESET of the entire chip, so it will end up blocking. Those nodes that attempt to address the blocking node will in turn themselves block. Similarly, if an attempt is made to read the declaration ROM of a node across a bridge and the far side of the bridge has not initialized, the ring interface chip on the near side of the bridge will block and, again, leaf nodes on its ring may themselves block. These problems are addressed, in accordance with the invention, as follows.

With respect to the second problem, the state of receive type 213 port of each ring interface 203 should be monitored. This may be done by a programmable logic device (PLD). The first two non-null symbols after /RESET goes away are the node ID of this node and the maximum node ID of its ring. Note that it is not necessary to store these values; it is sufficient to recognize that they have been seen. The state of the initialization of the ring may be captured through two registered bits, both of which are reset by the /RESET line being active. The first bit is set when any non-null symbol is seen. The second bit is set when any non-null symbol is seen and the first bit is set. The state of these two bits is utilized as described below. Two copies of this logic resides in each simple bridge: one copy for each ring interface 203. The logic for these bits may be expressed in pseudo code as follows:

```
Define: SymTypeIn RxT[1-0]    // the receive type bits
                              // of the ring interface
                              // 203 takes on values of
                              // Head, Data, Frame, Null
Define: Reset /RESET           // The reset line itself
                              // Reset takes on values of
                              // Active or Inactive
Define: NodeIDSeen             // a Boolean state used
                              // internally. NodeIDSeen
                              // takes on values of True
                              // or False
Define: MaxNodeIDSeen          // a Boolean state used
                              // internally.
                              // MaxNodeIDSeen takes on
                              // values of True or False
```

As a registered function, the pseudo code is:

```
if (Reset=Active) then
    NodeIDSeen= False
else if (SymTypeIn≠Null) then
    NodeIDSeen=True
else
    NodeIDSeen=NodeIDSeen    // Hold value if
                              // Null without
                              // Reset
```

As a registered function, the pseudo code is:

```
if (Reset=Active) then
    MaxNodeIDSeen=False
else if (SymTypeIn≠Null && NodeIDSeen=True)
    then MaxNodeIDSeen=True
else
    MaxNodeIDSeen=MaxNodeIDSeen    // Hold value if
                                     // Null without
                                     // Reset or
                                     // NodeIDSeen is
                                     // False
```

With respect to solving the first problem described above, hardware for determining whether the target field in the head symbol for the next ring is equal to Fh may be added between the two ring interface chips 203 at each bridge. If it is, then instead of passing the received symbol as a head symbol, it is sent as a null symbol (i.e., it does not appear in the next ring). The remaining symbols, both frame and data, that are part of that same packet must also be passed as null symbols. For purposes of illustration, if the two ring interface chips 203-a, 203-b in a bridge are called A and B, then the logic to perform this function for data received by chip A is expressed in pseudo code as follows:

```
Define: SymTypeIn RxT[1-0]     // the receive type bits
                               // for chip A. SymTypeIn
                               // takes on values if Head,
                               // Data, Frame, Null
Define: TargetIDIn RxS[27-24]  // the receive target field
                               // for chip A. TargetIDIn
                               // takes values from 0-Fh
Define: SymTypeOut TxT[1-0]    // the transmit type bits
                               // for chip B. SymTypeOut
                               // takes on values of Head,
                               // Data, Frame, Null
Define: Absorb                 // a Boolean state used
                               // internally. Absorb
                               // takes on values of True
                               // or False
Define: NodeIDSeen             // a Boolean state used
                               // internally. NodeIDSeen
                               // takes on values of True
                               // or False. It is the
                               // state for chip B that is
                               // used here.
Define: MaxNodeIDSeen          // a Boolean state used
                               // internally.
                               // MaxNodeIDSeen takes on
                               // values of True or False.
                               // It is the state for chip
                               // B that is used here.
```

As a combinatorial function:

```
if ((SymTypeIn=Head) && (TargetIDIn=Fh)
    || (symTypeIn≠Head) && (Absorb=True)) then
    SymTypeOut=Null
else
    SymTypeOut=SymTypeIn
```

As a registered function:

```
if (MaxNodeIDSeen=False) then
    Absorb=True          // Always absorb if Ring B
                         // uninitialized
else if ((SymtypeIn=Head) && (TargetIDIn=Fh)
    then
        Absorb=True
    else if (SymTypeIn=Head) &&
        (TargetIDIn≠Fh)
        then
            Absorb=False
        else
            Absorb=Absorb    // Hold value if
                              // not a head
                              // symbol
```

A second copy of the identical logic has to be implemented for the other direction. This logic requires that only two signals be generated for the transmit client interface of each ring interface 203. In summary, there are two outputs, three internal registers, and nine inputs for each half of the logic. The equations themselves fit into the eight OR terms of a standard programmable array logic (PAL) architecture. The input/output (I/O) and logic for one side of the bridge fit in a GAL16VS, manufactured by Lattice Semiconductor Corp., of Hillsboro, Oreg. The I/O and logic (slightly modified) for both sides will fit in a PAL22V10, manufactured by Advanced Micro Devices, Inc., of Sunnyvale, Calif., (under the assumption that the same /RESET line is shared by both of the ring interface chips 203 of the bridge). These devices are available in 5 nsec speed grades. Since, in the preferred embodiment, the ring interface 203 is implemented as a QR0001 chip manufactured by National Semiconductor, the ring interface 203 is able to operate at 50 MHz (clock period 20 nsec) on their client ports. Consequently, 5 nsec PAL devices can be introduced into the flow if the clock of the bridge has a 25 nsec period or 40 MHz. Thus, a crystal oscillator at that frequency is needed to drive the client interface clocks of the ring interface chips 203 and the PLD devices. The throughput of the bridge is then 160 Mbytes/sec which is still quite close to the theoretical ring interface chip 203 maximum of 180 Mbytes/sec. The use of cheaper PLDs with slower speed grades and correspondingly slower clock rates is also possible (e.g., 10 nsec GAL16V8 at 33 MHz).

Now, the problem of discovering the topology of the ring will be described. With bridges designed as described above, and with the requirement that the master node on a ring make the maximum node ID of its local ring available over the ring, a node can discover multi-ring topologies through the following algorithm, illustrated in FIG. 22.

At block 2201, a node begins the ring discovery process by identifying bridge nodes in its local ring. This is performed by executing GETs to each node of the local ring, attempting to read the byte lane information contained in the declaration ROM of that node. At the same time, the node performing the discovery sets a timer for the response. If the timer expires before any data has returned from the GET, then the corresponding node is presumed to be a bridge node. This is because, as explained above, simple bridge nodes do not have declaration ROMs. The value for the timer should preferably be quite long (at least 250 msecs) in case the addressed node is busy.

After all bridges on the local ring have been identified, the next step (block 2203) in the discovery algorithm is to determine whether the ring on the far side of each local bridge has been initialized. This is accomplished by executing a GET to the declaration ROM of node 0 on the far side of each identified bridge. At the same time, a timer is set for the response. If the timer expires before any data has returned, then it is presumed that the ring on the far side of the bridge is uninitialized. Note that if the timer does expire, no access can be made to other nodes of the next ring, because the maximum node number for that ring is unknown.

If node 0 of the next ring does respond, then the discovering node should obtain the maximum node ID in the next ring from node 0.

Next, at block 2205, the discovering node identifies remaining bridges on other rings. This is accomplished after obtaining the maximum node ID in the next ring (see above) by querying the remaining nodes in that ring. Any node that does not respond within a set period of time is presumed to be a bridge. For each bridge node in the next ring, the discovering node uses the same algorithm to find rings that are two hops away, If there is only one bridge node in the next ring, then that node is the far side of the bridge in the local ring (one hop out the bridge and one hop back).

Continuing at block 2207, if there is more than one bridge node in the next ring, one of the rings that is two hops away will be the local ring. Once a ring two hops away is found that has the same number of nodes as the local ring, check the unique ID in that ring's node 0 declaration ROM to see if it is the same as in the local ring.

Next, at block 2209, the discovering node continues using the same algorithm to find the topology of the rings more than two hops away. Now, the check of the node 0 unique ID will identify that a ring three hops away is the same as the ring one hop away.

By making use of the unique ID of other node 0's, multiple paths to the same ring can be identified by the same node being reachable through different paths. This allows discovery of arbitrarily complex ring topologies.

The above algorithm should work well for relatively small topologies. However, because the algorithms require every instigator in the system to individually query every other node in the system and read large parts (or all) of its declaration ROM, the amount of traffic at system startup could become unmanageable for large systems. In such cases, it might be necessary to add broadcast mechanisms and ring IDs to the ring interface chip 203 to fix this.

Because the algorithm described above identifies bridge nodes whose other side is uninitialized, a mechanism to retest the state of such rings is necessary. Because the typical reason that the other ring is uninitialized is that one or more nodes needs its power switched flipped by a person, it would not make sense to halt operation until the other ring is initialized. The parts of the topology that are functioning can be used. In most cases the state of the uninitialized ring need not be retested until a user attempts to obtain information about network topology (analogous to a user using the Chooser on an AppleTalk network, manufactured by Apple Computer, Inc.).

In order to implement a ring protocol in accordance with the present invention, certain resources should be present at each node. These resources will now be described.

At each node that is capable of receiving data, there should be a table for maintaining the current location to place incoming data for each active port. Additionally, nodes that support byte addressing will need to store the buffer length so that partial writes of the final data symbol can be implemented. Also, nodes that support wrap around addressing will need to store the buffer start location to enable the wrap around function. The size of this table varies directly with the number of simultaneous streams the node supports. Nodes that support degenerate PUTs should have an equivalent table for each node in the ring topology rather than each port.

Additionally, each node that is capable of sending data should have a table of all the outstanding buffers of data to be sent out of the node. This table would hold the current buffer pointer and the buffer length for each connection. The two connection field bits that are to be used are also stored for each stream of data.

Also, because the data symbols used to set up a transaction may be separated and interleaved with packets from one or more other nodes, a node should be able to maintain state information on the progress of transaction setup for multiple pending transactions at a time. Because any of the other nodes may be initiating a PUT or a GET to this node at anytime, the size of this state table can be quite large for nodes that support multi-ring topologies. In order to minimize the resources required, any node that has initiated a transaction setup with another node should desist from initiating another transaction setup with the same node until the first transaction has reached the data transfer stage. Nodes that do not support multi-ring topologies would need 1 entry in this state table as instigator, and 15 entries as partner.

For a node that has a NuBus interface for use in a Macintosh Computer, manufactured by Apple Computer, Inc., certain supporting control and status registers should be present.

For such a node in such a computer, the following register bits should be accessible over the NuBus to implement certain features:

1) A bit to toggle the state of the /RESET pin (not shown) on the ring interface chip 203. This bit must power up in the active state.

2) A bit to force /RxSTALL to go inactive and cause data flowing in from the ring to be dropped rather than written to a location in memory. This allows recovery from certain error states without a reset of the entire ring.

3) A bit to enable a stable clock source onto the MCLK pin (not shown) of the ring interface chip 203 and to set the M/S pin (not shown) of the ring interface chip 203 high. This bit is used before the /RESET pins are allowed to go inactive on the ring interface chips 203 to select one and only one master node on the ring. This is not a requirement for simple bridges; they may only be slave nodes of a ring.

4) A status register that returns the Node ID of the board, the maximum Node ID on the ring, and the state of the /ABORT pin (not shown) on the ring interface chip 203. The maximum node ID on the ring must power up to 0 so that the central processing unit (CPU) can detect that the ring has not completed initialization and is therefore unusable.

5) For boards having an optional daughter card that has a ring interface chip 203 on it, there should be a bit in the status register indicating whether the daughter card is installed.

6) If the daughter card with the ring interface chip 203 has its own declaration ROM, then it is required that there be a method to read that ROM over the NuBus. The address and the protocol to do this is declared in the NuBus declaration ROM.

For nodes that are external to any computer, the following implementation details are applicable:

1) An external node should drive /RESET active at power up and then inactive at the time that the functionality of the device is ready to be made available over the ring.

2) An external node should have a hardware or a software switch that allows the device to power up as a ring master or a ring slave. A software implementation of this feature is useful for devices that have one or more other interfaces (e.g., RS-232, SCSI, Ethernet). This is not a requirement for simple bridges; they may only be slave nodes of a ring. External nodes are preferably slaves, except where this is not possible.

Referring now to FIGS. 23*a*–23*e*, an example of an implementation of a node 2300 for interfacing a Motorola 68040 microprocessor to a ring in accordance with the present invention will now be described. In this example, the node 2300 is intended to support the following protocol features on a single ring topology:

1) Instigator of GETs
2) Instigator of PUTs
3) Instigator of degenerate PUTs
4) Partner of GETs
5) Partner of PUTs
6) Partner of degenerate PUTs Further, the node 2300 supports ten protocol ports: one messaging port (Fh), one response port (Eh) when the node 2300 is the instigator of a PUT, and eight data ports (0–7) when the node 2300 is an instigator of a GET or a partner of a PUT.

As an overview to understanding the various modules and functions of the node 2300, the following description is presented.

FIG. 23*a* is a high-level block diagram of the hardware and control logic for the node 2300. The various abbreviations used to identify the blocks are as follows: Instigator of GET is abbreviated IG; Instigator of PUT is abbreviated IP; Instigator of Degenerate PUT is abbreviated IDP; Partner of GET is abbreviated PG; Partner of PUT is abbreviated PP; and Partner of Degenerate PUT is abbreviated PDP. The remaining abbreviations are well-known in the art, and are described further below.

A number of blocks shown in FIG. 23*a* are depicted in more detail in subsequent drawings. FIG. 23*b* is a more detailed block diagram of the logic and hardware associated with the main state machine 2351. The IG,PP Port Registers 2313 are illustrated in more detail in FIG. 23*c*. FIG. 23*d* shows a more detailed block diagram of the transaction registers 2311. The hardware associated with constructing a head symbol is also depicted in FIG. 23*d*. A detailed block diagram of the hardware and control logic associated with the Bus Master DMA engine 2349 is illustrated in FIG. 23*e*.

Three 32-bit wide buses are utilized in the design. One is the bus out of the ring interface chip 2309: RxS 2301 tied to TxS 2303. The other two are the Processor Address bus 2305 and the Processor Data bus 2307.

State information for the node 2300 is stored in two main arrays. The transaction registers 2311 hold information on a per node basis for all of the nodes, including the present node 2300, on the single ring. The port registers 2313 hold information on a per port basis for ports 0 through 7.

The arrays of state information can be accessed from three sources: by the host CPU interface 2315, by the node and port fields acquired from head symbols arriving off of the ring, and by sequencers on the node 2300 itself which can search sequentially through the state information arrays.

When the node 2300 is in the idle state, the RxSTALL bit 2317 is deasserted and the RxOE pin 2319 is asserted.

When a symbol is received off of the ring from RxS 2301, the type is decoded in the Symbol Type Decoder 2321.

An output of the Symbol Type Decoder 2321 is connected to the Node and Port Extraction module 2323. When the symbol is a head symbol, the Node and Port Extraction module 2323 captures the node ID from bits 0:3 and the port from bits 20:23.

Also connected to an output of the Symbol Type Decoder 2321 is a Frame Symbol Code Decoder (FSC Decoder) 2325. When the symbol is a frame symbol, the FSC Decoder 2325 determines the type of FSC was received. The FSC Decoder 2325 outputs information to the Transaction Setup module 2327 and the Target Transaction Completion module 2329.

Operation of the node 2300 depends on the type of transaction taking place. The detailed functions for implementing the transactions supported by the node 2300 will be now described separately for each transaction.

The sequence of operations that take place for transaction setup for the node 2300 as the partner of a PUT are as follows:

The node ID of the instigator is captured from the head symbol.

The messaging port is captured from the head symbol.

The PUT FSC is decoded by the FSC decoder 2325. The state of transaction bits for the instigator node are changed in the state of transaction array 2331 (located in the transaction registers 2311) to indicate that a PUT FSC has been seen.

The 22 bits that contain the port and the connection field of the response are stored in the PP,PG RAM array 2333 in the transaction registers 2311. The state of transaction bits for the instigator node are changed to indicate that a PUT FSC and response port have been seen.

The 32 bits of starting address are stored in the Address RAM array 2335 in the transaction registers 2311. The state of transaction bits for the instigator node are changed to indicate that a PUT FSC and address have been seen.

The 32 bits of length are ignored because they are needed for a PUT. The state of transaction bits for the instigator node in the state of transaction array 2331 are changed to indicate that a PUT FSC and length have been seen.

The RxSTALL pin 2317 of the Ring Interface Chip 2309 is asserted and the RxOE pin 2319 is deasserted.

The Port Sequencer 2337 is enabled as the selector to the Port Registers 2313.

The Available bit for that port in the Port Available Array 2339 is examined and if asserted, that port becomes the port for this transaction. Otherwise, the Port Sequencer 2337 increments (mod 8) and the available bit for the next port is examined. If all 8 ports are unavailable, a bit is set to indicate that there is a pending need for a port and the idle state is re-entered.

If a port is found, the node 2300 requests the bus from the host CPU.

When the bus is granted, the address is moved from the Address RAM array 2335 in the transaction registers 2311 to the port register address (specified by the port that was found) in the current address array 2341 of the port registers 2313.

The node 2300 sends a head symbol to the instigator by reading out from the PP,PG RAM array 2333 and enabling the node ID through the BUF module 2345 of the IP,PP,PG Head Symbol generator 2343.

The node 2300 sends a data symbol to the instigator with the selected port in bits 28:31.

The state of transaction bits for the instigator node are changed to indicate that no transaction is active (the port registers 2313 will take care of the data transfer portion of the transaction).

The node 2300 re-enters the idle state. (The procedures to be followed upon the receipt of symbols on a data port (0–7) are described below.)

The sequence of operations that take place for transaction setup for the node 2300 as the partner of a GET are as follows:

The node ID of the instigator is captured from the head symbol.

The messaging port is captured from the head symbol.

The GET FSC is decoded by the FSC decoder 2325. The state of transaction bits for the instigator node are changed in the state of transaction array 2331 (located in the transaction registers 2311) to indicate that a GET FSC has been seen.

The 22 bits that contain the port and the connection field of the response are stored in the PP,PG Ports RAM array 2333 in the transaction registers 2311. The state of transaction bits for the instigator node are changed to indicate that a GET FSC and data port have been seen.

The 32 bits of starting address are stored in the Address RAM array 2335 in the transaction registers 2311. The state of transaction bits for the instigator node are changed to indicate that a GET FSC and address have been seen.

The 32 bits of length are loaded into the Bus Master 30-bit down counter 2347 (the two least significant bits are discarded). The state of transaction bits for the instigator node in the state of transaction array 2331 are changed to indicate that no transaction is active (because the node 2300 will be proceeding directly to the DMA phase that completes the GET operation).

The RxSTALL pin 2317 of the Ring Interface Chip 2309 is asserted and the RxOE pin 2319 is deasserted.

The node 2300 sends a head symbol to the instigator by reading out from the PP,PG Ports RAM array 2333 and enabling the node ID through the BUF module 2345 of the IP,PP,PG Head Symbol generator 2343.

The node 2300 requests the Processor Address bus 2305 and the Processor Data bus 2307 from the CPU.

The node 2300 loads the address into the 30-bit address counter of the Bus Master DMA engine 2349 (the two least significant bits are discarded).

The Bus Master DMA engine 2349 then reads data from the host CPU interface 2315 and places it on the TxS bus 2303 until the length counter reaches 0.

The Bus Master DMA engine 2349 signals the end of the transfer to the main state machine 2351 and a Notice of Completion (NoC) FSC is sent.

The node 2300 relinquishes the processor buses and re-enters the idle state.

The sequence of operations that take place for transaction setup for the node 2300 as the partner of a degenerate PUT are as follows:

The node ID of the instigator is captured from the head symbol.

The messaging port is captured from the head symbol.

The Degenerate PUT FSC is decoded by the FSC decoder 2325. The state of transaction bits for the instigator node are changed in the state of transaction array 2331 (located in the transaction registers 2311) to indicate that a Degenerate PUT FSC has been seen.

The 32 bits of starting address are stored in the Address RAM array 2335 in the transaction registers 2311. The state of transaction bits for the instigator node are changed to indicate that a Degenerate PUT FSC and address have been seen.

The 32 bits of length are ignored because they are needed for a Degenerate PUT. The state of transaction bits for the instigator node in the state of transaction array 2331 are changed to indicate that a Degenerate PUT FSC and length have been seen.

The node 2300 requests the Processor Address bus 2305 and the Processor Data bus 2307 from the CPU.

As the data arrives, the Bus Master DMA engine 2349 writes it to the host CPU interface 2315.

When a head symbol arrives from a different node, the current address is stored from the Bus Master DMA engine 2349 back into the Address RAM array 2335 in the transaction registers 2311.

The node 2300 relinquishes the processor buses and re-enters the idle state.

When a head symbol arrives from the instigator node, the state of the transaction bits for the instigator node are read from the state of transaction array 2331.

Because a Degenerate PUT is in progress at the data transfer stage, the address is loaded into the Bus Master DMA engine 2349.

The data is written to the host CPU interface 2315 as it arrives by the Bus Master DMA engine 2349.

When a Notice of Completion FSC arrives, the state of transaction bits for the instigator node are changed to indicate that no transaction is active.

The sequence of operations that take place for transaction setup for the node 2300 as the instigator of a GET are as follows:

The Host CPU (not shown), acting through the host CPU interface 2315, takes control of the node 2300 by asserting the host access feature (not shown).

The main state machine 2351 yields to the host when it is between activities.

The Host CPU examines the contents of the Port Available Array 2339 to find an available port.

If no port is available, the Host CPU deasserts the host access feature and tries again whenever it chooses.

If a port is available, the Host CPU writes the address where the data is to be written into the current address array 2341 location corresponding to the available port.

The Host CPU writes to the address corresponding to the available port in the Port Available Array 2339 to indicate that the port is no longer available.

The Host CPU writes the five symbols that set up a GET transaction directly to the TxS 2303 interface.

The Host CPU deasserts the host access feature (The procedures to be followed upon the receipt of symbols on a data port (0–7) are described below.)

The sequence of operations that take place for transaction setup for the node 2300 as the instigator of a PUT are as follows:

The Host CPU (not shown), acting through the host CPU interface 2315, takes control of the node 2300 by asserting the host access feature (not shown).

The main state machine 2351 yields to the host when it is between activities.

The Host CPU writes the address to read the data from for the PUT into the Address RAM array 2335 at the location selected with the node ID of the node 2300 itself.

The Host CPU writes the length to read into the IP,IDP Length Register 2353.

The Host CPU writes the connection field bits for the data transfer into the REG Host IP Connection module 2355 within the IP,PP,PG Head Symbol generator 2343.

In the state of transaction array 2331, the state of transaction bits for the host node are changed to indicate that a PUT has been instigated.

The Host CPU writes the five symbols that set up a PUT transaction directly to the TxS 2303 interface (using Eh as the response port identifier).

The Host CPU deasserts the host access feature.

Upon the arrival of a head symbol on node Eh, the node 2300 knows that this is the response to the instigation of a PUT.

In the state of transaction array 2331, the state of transaction bits for the node's 2300 own node ID are changed to indicate that no transaction is active.

The node ID of the partner is captured by the Node and Port Extraction module 2323.

The next data symbol has its 20 bits of port captured in the REG port module 2357 within the IP,PP,PG Head Symbol generator 2343.

The RxSTALL bit 2317 of the ring interface chip 2309 is asserted and the RxOE pin 2319 is deasserted.

The head symbol is sent out using the modules shown within the IP,PP,PG Head Symbol generator 2343.

The node 2300 requests the Processor Address bus 2305 and the Processor Data bus 2307 from the CPU.

The length is loaded into the Bus Master DMA engine 2349 from the IP,IDP Length Register 2353.

The Bus Master DMA engine 2349 then reads data from the host CPU interface 2315 and places it on the TxS bus 2303 until the length counter reaches 0.

The Bus Master DMA engine 2349 signals the end of the transfer to the main state machine 2351 and a Notice of Completion (NoC) is sent.

The node 2300 relinquishes the processor buses and re-enters the idle state.

The sequence of operations that take place for transaction setup for the node 2300 as the instigator of a Degenerate PUT are as follows:

The Host CPU (not shown), acting through the host CPU interface 2315, takes control of the node 2300 by asserting the host access feature (not shown).

The main state machine 2351 yields to the host when it is between activities.

The Host CPU writes the node ID of the node 2300 itself into the Host Node Register (located in the Host Node and Port Registers 2359).

The Host CPU writes the address to read the data from for the Degenerate PUT into the Address RAM array 2335 at the location selected with the node ID of the node 2300 itself.

The Host CPU writes the length to read into the IP,IDP Length Register 2353.

The Host CPU writes the four symbols that set up a Degenerate PUT transaction directly to the TxS 2303 interface (using the messaging port, Fh).

The Host CPU sets a bit that will cause the main state machine 2351 to proceed immediately to send the data.

The Host CPU deasserts the host access feature.

The node 2300 requests the Processor Address bus 2305 and the Processor Data bus 2307 from the CPU.

The length is loaded into the Bus Master DMA engine 2349 from the IP,IDP Length Register 2353.

The Bus Master DMA engine 2349 then reads data from the host CPU interface 2315 and places it on the TxS bus 2303 until the length counter reaches 0.

The Bus Master DMA engine 2349 signals the end of the transfer to the main state machine 2351 and a Notice of Completion (NoC) is sent.

The node 2300 relinquishes the processor buses and re-enters the idle state.

The sequence of operations that take place upon the receipt of symbols on a data port (0–7) are described below:

The node 2300 requests the Processor Address bus 2305 and the Processor Data bus 2307 from the CPU, and loads the address found in the current address array 2341 for that port into the Bus Master DMA engine 2349.

As the data arrives, the Bus Master DMA engine 2349 writes it to the Host CPU interface 2315.

If a head symbol arrives from a different port, the current address is stored from the Bus Master DMA engine 2349 back into the current address array 2341 for that port.

The node 2300 relinquishes the processor buses and re-enters the idle state.

When a Notice of Completion (NoC) FSC arrives, the state of the corresponding bit in the Port Available Array 2339 is changed to indicate that the port is available.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for ascertaining topology of a packet communication system having a ring interconnect architecture, the ring interconnect architecture comprising at least one ring, each ring comprising at least one node, each of said at least one node being selected from the group consisting of leaf nodes and bridge nodes, wherein each leaf node has a node identifier not shared by any other node on a same ring and a readable data source at a known address, and each bridge node is uniquely associated with a far side bridge node coupled to a far side ring, and wherein a packet received by a bridge node is delivered to the associated far side bridge node for placement on the far side ring only if the packet does not designate the bridge node as a final destination, and wherein a packet which designates a bridge node as a final destination is discarded by the designated bridge node, the method comprising the steps of:

sending a packet from an instigator node to a first known node on a first ring, the packet being encoded to solicit a first unique identifier stored at the first known node;

at the instigator node, receiving a packet containing the first unique identifier;

sending a packet from the instigator node to the first known node, the packet being encoded to solicit node identifiers of all nodes on the first ring;

at the instigator node, receiving a packet containing the solicited node identifiers of all nodes on the first ring;

using the node identifiers of all nodes on the first ring to send a packet from the instigator node to each node on the first ring, wherein the packet is encoded to solicit data from the readable data source of a partner node, and wherein when a partner node sends the solicited data to the instigator node, the solicited data is accompanied by a partner node identifier;

waiting for solicited data to return;

if solicited data is received by the instigator node from a responding node, then identifying the responding node having the accompanying partner node identifier as a first ring leaf node in the first ring;

if solicited data is not received from a nonresponding node within a predetermined time period, then identifying the nonresponding node as a first ring bridge node in the first ring, the first ring bridge node being associated with a far side bridge node in a second ring;

for each identified first ring bridge node, sending a packet from the instigator node through the identified first ring bridge node to a second known node on the second ring, the packet being encoded to solicit identifiers of all nodes on the second ring;

at the instigator node, receiving a packet containing the solicited node identifiers of all nodes on the second ring;

for each identified first ring bridge node, sending a second packet from the instigator node through the identified first ring bridge node to each node on the second ring, wherein the second packet is encoded to solicit data from the readable data source of a partner node, and wherein when a partner node sends the solicited data to the instigator node, the solicited data is accompanied by a partner node identifier;

waiting for solicited data to return;

if solicited data is received by the instigator node from a responding node, then identifying the responding node having the accompanying partner node identifier as a second ring leaf node in the second ring;

if solicited data is not received from a nonresponding node within a predetermined time period, then identifying the nonresponding node as a second ring bridge node in the second ring, the second ring bridge node being associated with a far side bridge node in a third ring;

for each identified second ring bridge node, sending a packet from the instigator node through the identified second ring bridge node to a third known node on the third ring, the packet being encoded to solicit a third unique identifier stored at the third node;

at the instigator node, receiving a packet containing the solicited third unique identifier; and at the instigator node, determining whether the second ring bridge node is the associated far side bridge node of the first ring bridge node by determining that the first unique identifier is the same as the third unique identifier.

2. In a packet communication system having a ring interconnect architecture, the ring interconnect architecture comprising at least one ring, each ring comprising at least one node, each of said at least one node being selected from the group consisting of leaf nodes and bridge nodes, wherein each leaf node has a node identifier not shared by any other node on a same ring and a readable data source at a known address, and each bridge node is uniquely associated with a far side bridge node coupled to a far side ring, and wherein a packet received by a bridge node is delivered to the associated far side bridge node for placement on the far side ring only if the packet does not designate the bridge node as a final destination, and wherein a packet which designates a bridge node as a final destination is discarded by the designated bridge node, an apparatus located in an instigator node for ascertaining topology of the packet communication system, the apparatus comprising:

means for sending a packet from the instigator node to a first known node on a first ring, the packet being encoded to solicit a first unique identifier stored at the first known node;

means for receiving a packet containing the first unique identifier;

means for sending a packet from an instigator node to the first known node, the packet being encoded to solicit node identifiers of all nodes on the first ring;

means for receiving a packet containing the solicited node identifiers of all nodes on the first ring;

means for using the node identifiers of all nodes on the first ring to send a packet from the instigator node to each node on the first ring, wherein the packet is encoded to solicit data from the readable data source of a partner node, and wherein when a partner node sends the solicited data to the instigator node, the solicited data is accompanied by a partner node identifier;

means for waiting for solicited data to return;

means, responsive to receipt of solicited data from a responding node, for identifying the responding node having the accompanying partner node identifier as a first ring leaf node in the first ring;

means, responsive to not receiving solicited data from a nonresponding node within a predetermined time period, for identifying the nonresponding node as a first ring bridge node in the first ring, the first ring bridge node being associated with a far side bridge node in a second ring;

means for sending a packet from the instigator node through an identified first ring bridge node to a second known node on the second ring, the packet being encoded to solicit identifiers of all nodes on the second ring;

means for receiving a packet containing the solicited node identifiers of all nodes on the second ring;

means for sending a second packet from the instigator node through an identified first ring bridge node to each node on the second ring, wherein the second packet is encoded to solicit data from the readable data source of a partner node, and wherein when a partner node sends the solicited data to the instigator node, the solicited data is accompanied by a partner node identifier;

means for waiting for solicited data to return;

means, responsive to receipt of solicited data from a responding node, for identifying the responding node having the accompanying partner node identifier as a second ring leaf node in the second ring;

means, responsive to not receiving solicited data from a nonresponding node within a predetermined time period, for identifying the nonresponding node as a second ring bridge node in the second ring, the second ring bridge node being associated with a far side bridge node in a third ring;

means for sending a packet from the instigator node through an identified second ring bridge node to a third known node on the third ring, the packet being encoded to solicit a third unique identifier stored at the third node;

means for receiving a packet containing the solicited third unique identifier; and means for determining whether the second ring bridge node is the associated far side bridge node of the first ring bridge node by determining that the first unique identifier is the same as the third unique identifier.

* * * * *